(12) United States Patent
Carrasco

(10) Patent No.: US 12,162,694 B2
(45) Date of Patent: Dec. 10, 2024

(54) TRANSPORT DEVICE WITH AN ULTRASONIC GENERATOR AND OPERATING METHOD

(71) Applicant: A O IDEAS GMBH, Schocherswil (CH)

(72) Inventor: César Carrasco, Schocherswil (CH)

(73) Assignee: A O IDEAS GMBH, Schocherswil (CH)

( * ) Notice: Subject to any disclaimer, the term of this patent is extended or adjusted under 35 U.S.C. 154(b) by 0 days.

(21) Appl. No.: 18/008,573

(22) PCT Filed: Jun. 16, 2021

(86) PCT No.: PCT/EP2021/066319
§ 371 (c)(1),
(2) Date: Dec. 6, 2022

(87) PCT Pub. No.: WO2021/255132
PCT Pub. Date: Dec. 23, 2021

(65) Prior Publication Data
US 2023/0312259 A1    Oct. 5, 2023

(30) Foreign Application Priority Data

Jun. 19, 2020 (EP) .................................... 20181038
Nov. 24, 2020 (EP) .................................... 20209580
Mar. 12, 2021 (EP) .................................... 21162463

(51) Int. Cl.
*B65G 27/04* (2006.01)
*B65G 27/24* (2006.01)

(52) U.S. Cl.
CPC ............. *B65G 27/04* (2013.01); *B65G 27/24* (2013.01); *B65G 2201/042* (2013.01)

(58) Field of Classification Search
None
See application file for complete search history.

(56) References Cited

U.S. PATENT DOCUMENTS 3,628,071 A * 12/1971 Harris ....................... B06B 3/02
228/1.1
5,270,484 A * 12/1993 Tsuchiya ................ G03G 15/09
417/322
(Continued)

FOREIGN PATENT DOCUMENTS

DE    10 2006 037 638 A1    2/2008
DE    10 2006 047 592 A1    4/2008
(Continued)

OTHER PUBLICATIONS

Aug. 31, 2021 International Search Report issued in Patent Application No. PCT/EP2021/066319.
(Continued)

*Primary Examiner* — William R Harp
(74) *Attorney, Agent, or Firm* — Oliff PLC

(57) ABSTRACT

The transport device, which serves for the transport of pulverous or granular process material, includes an open or in itself closed transport frame made of metal for transporting process material, is held by a support device and is connected to an ultrasonic device having an ultrasonic generator, an ultrasonic transducer connected to the ultrasonic generator and a coupling rod connected to the ultrasonic transducer and having front and rear end pieces. A flat distributor body made of metal has upper, lower, rear sides and peripherally at least one connection side. The rear end piece of the coupling rod is connected to the ultrasonic transducer. The front end piece of the coupling rod is welded to the rear, upper, or lower side of the distributor body. The at least one connection side of the distributor body is integrally connected with or welded to the at least one transport frame.

10 Claims, 15 Drawing Sheets

(56) References Cited

U.S. PATENT DOCUMENTS

Figure 1:
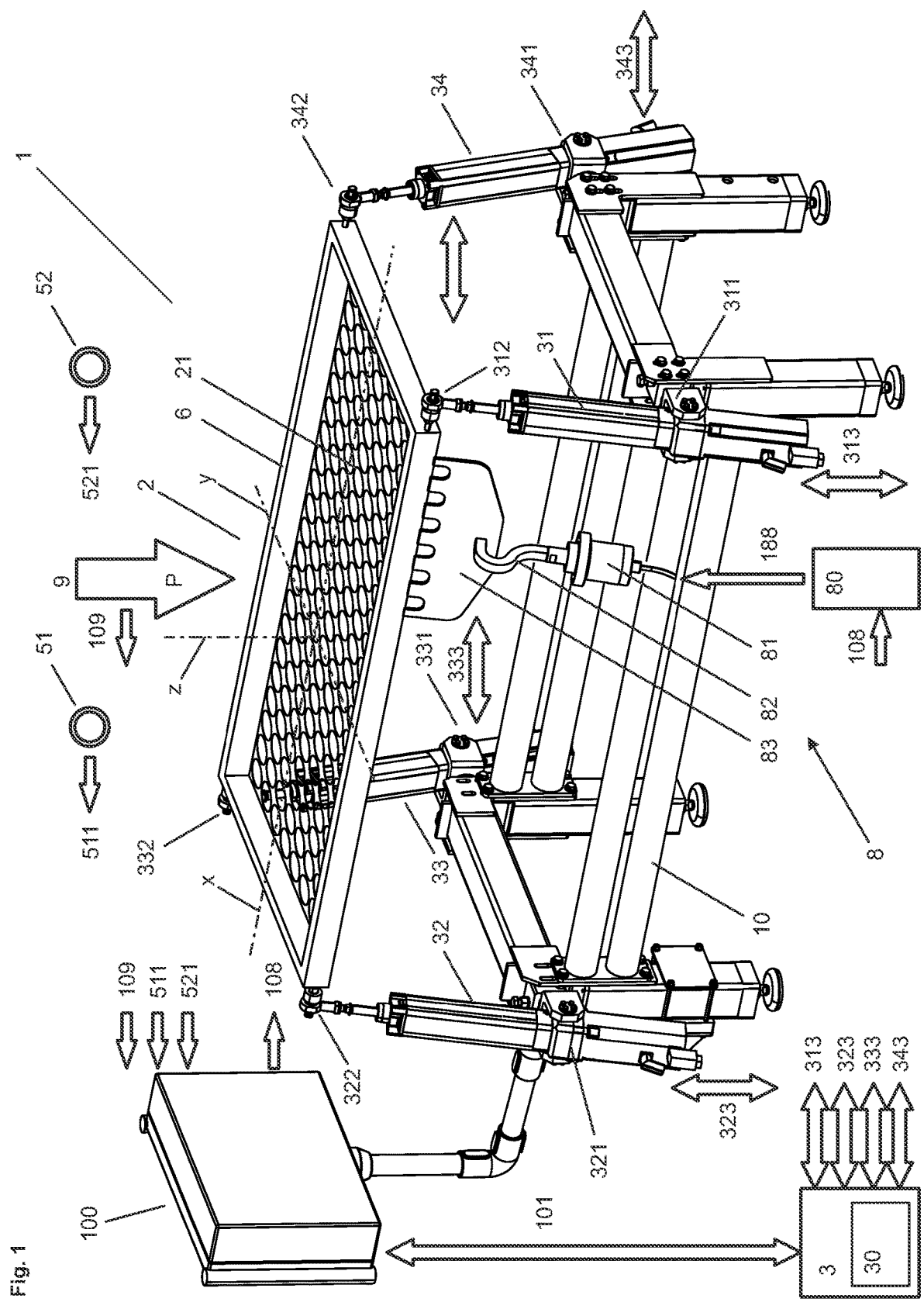

| | | | | |
|---|---|---|---|---|
| 5,386,169 | A * | 1/1995 | Dubruque | B07B 1/40 |
| | | | | 209/346 |
| 5,810,155 | A * | 9/1998 | Hashimoto | B65G 27/00 |
| | | | | 198/752.1 |
| 6,802,220 | B2 * | 10/2004 | Takasan | B06B 1/0238 |
| | | | | 73/570.5 |
| 8,794,430 | B2 * | 8/2014 | Woollard | B65G 27/16 |
| | | | | 198/758 |
| 11,185,889 | B2 * | 11/2021 | Carrasco | G09B 9/12 |
| 2020/0061673 | A1 | 2/2020 | Carrasco | |

FOREIGN PATENT DOCUMENTS

| | | |
|---|---|---|
| DE | 10 2012 108 529 A1 | 3/2014 |
| JP | 2003-145051 A | 5/2003 |
| WO | 2018/219840 A1 | 12/2018 |

OTHER PUBLICATIONS

Aug. 31, 2021 Written Opinion of the International Searching Authority issued in Patent Application No. PCT/EP2021/066319.

* cited by examiner

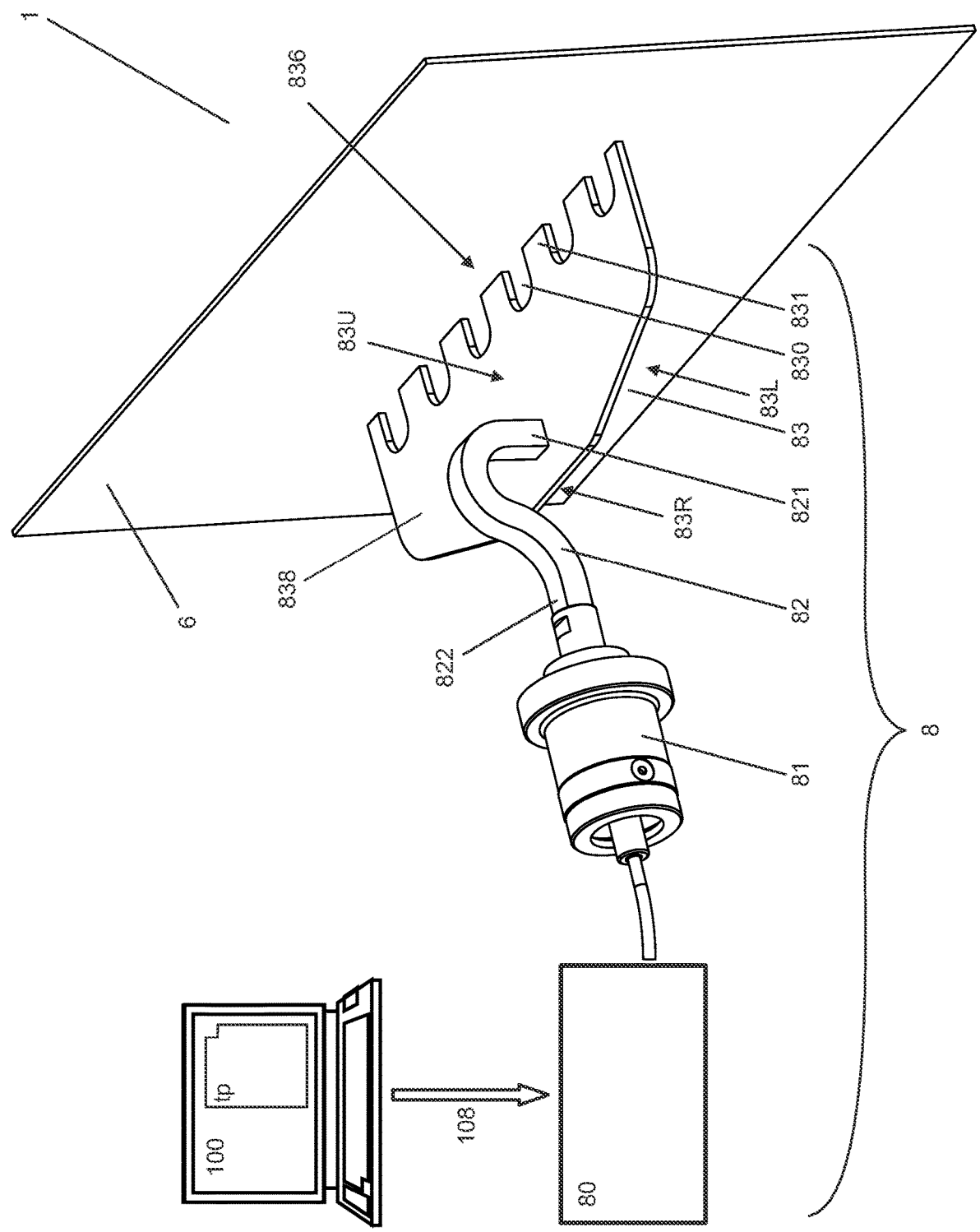

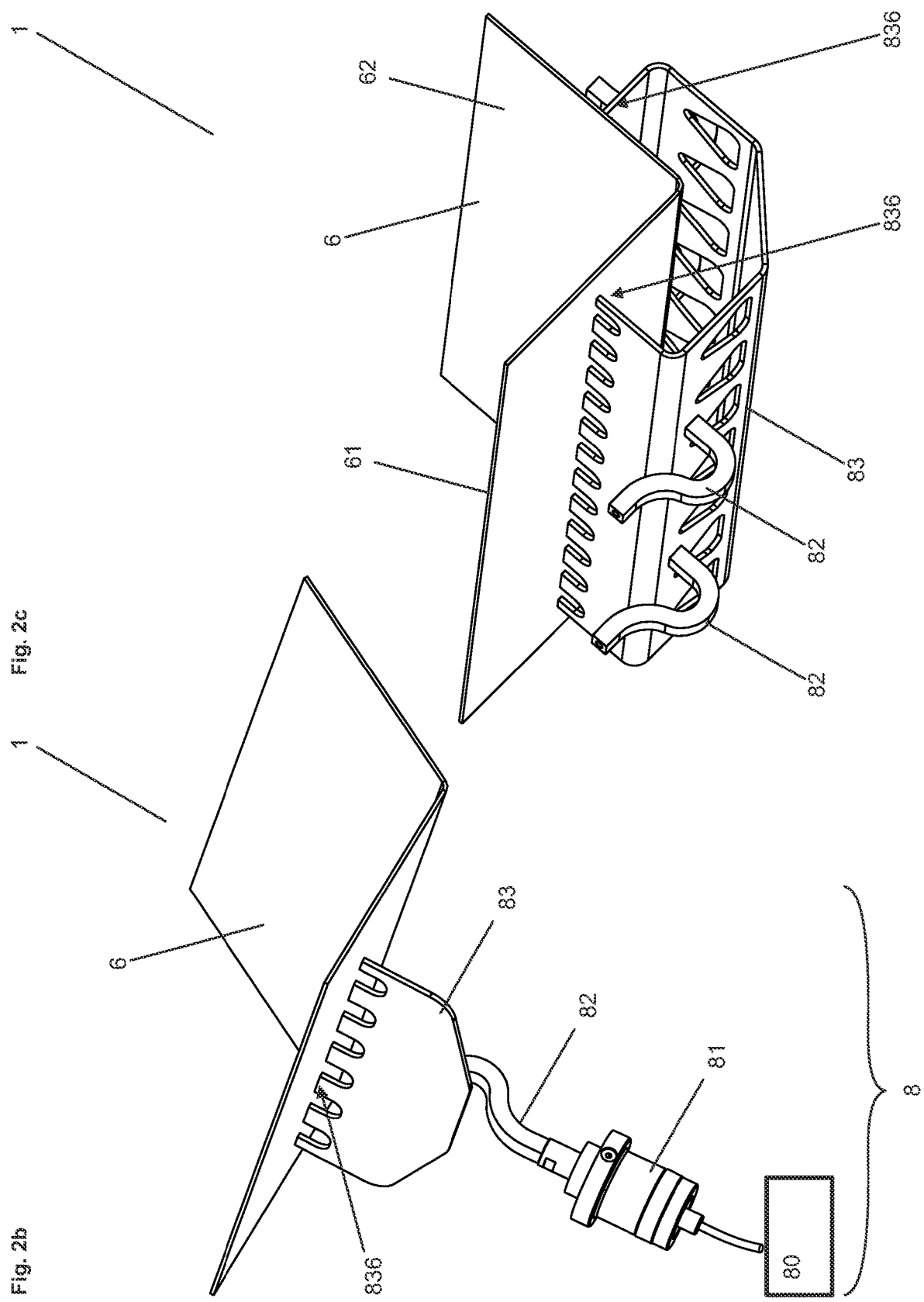

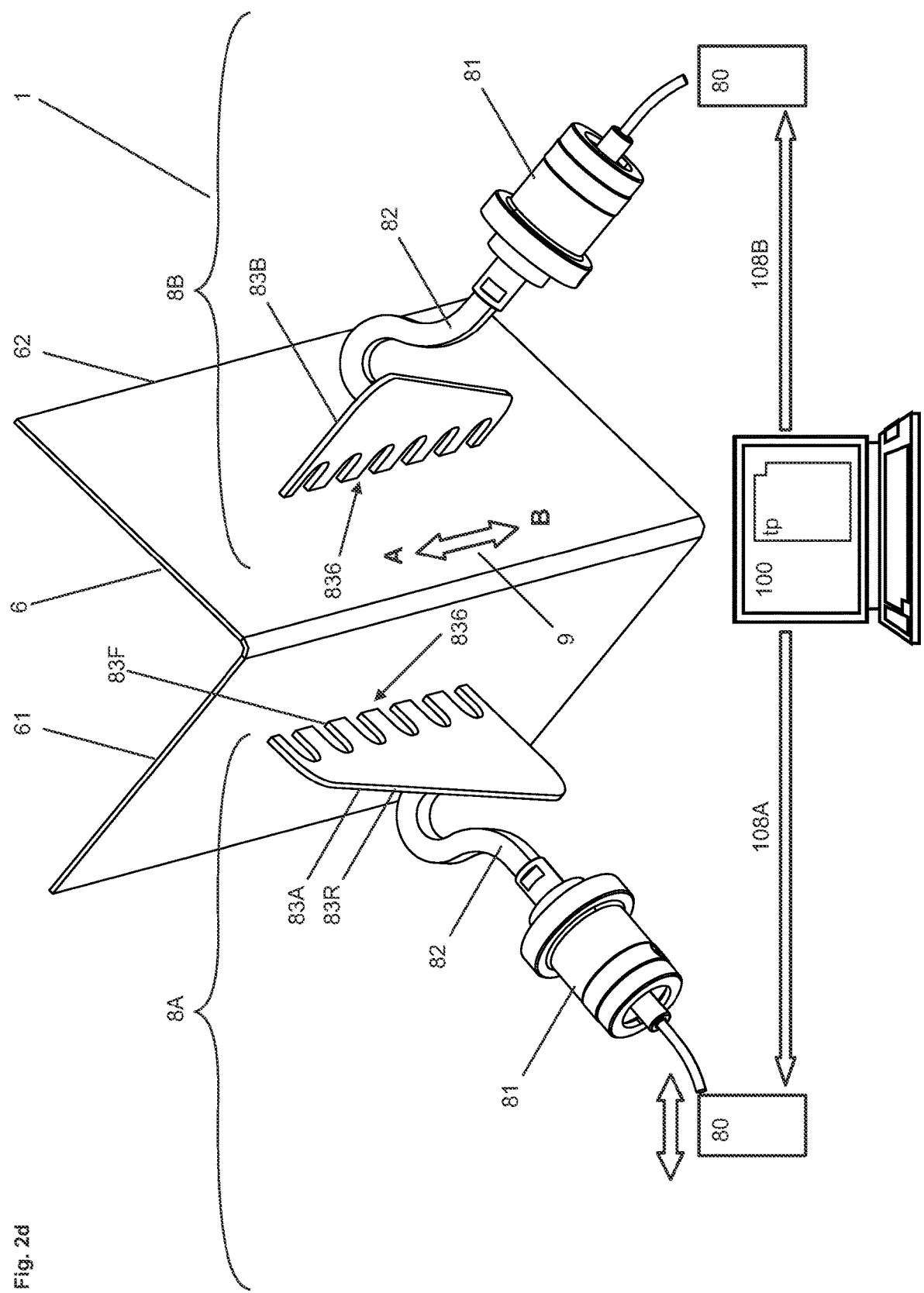

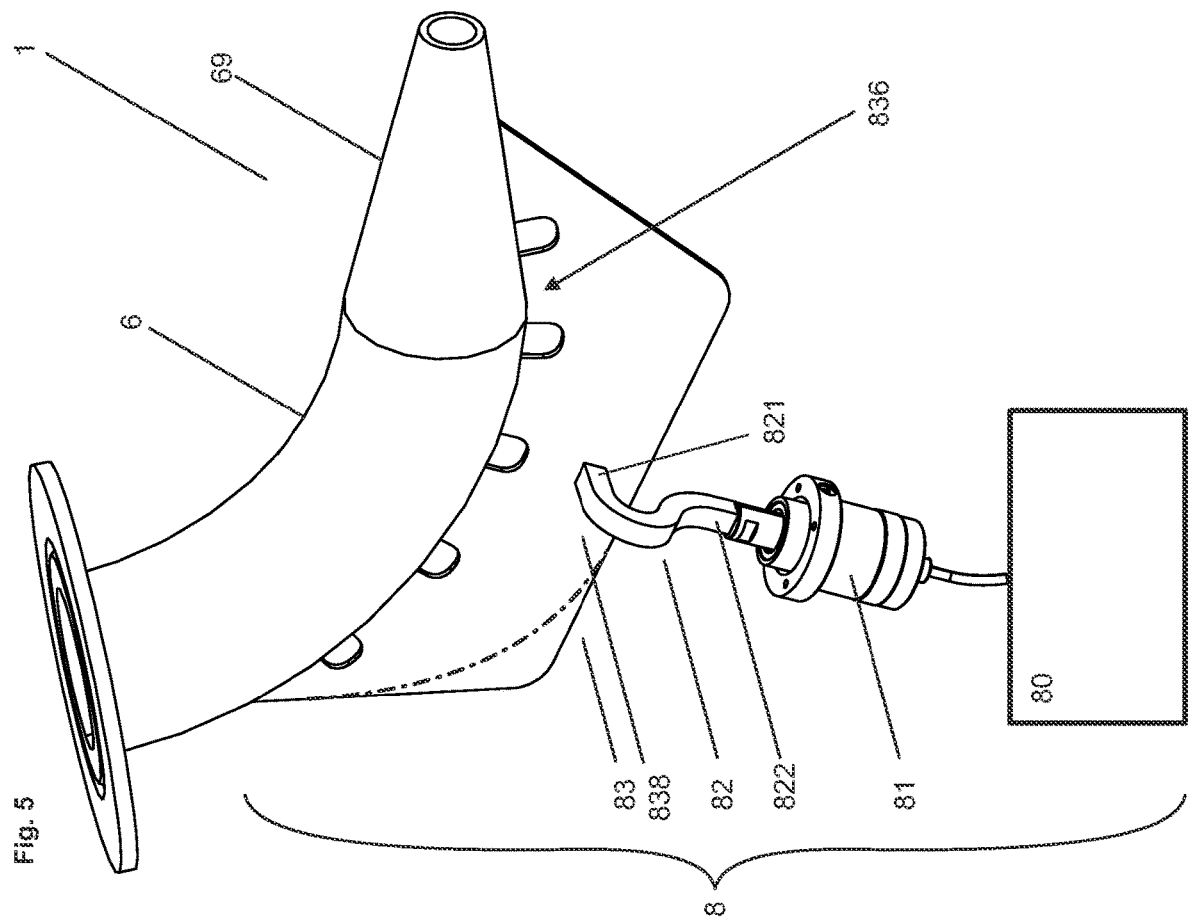
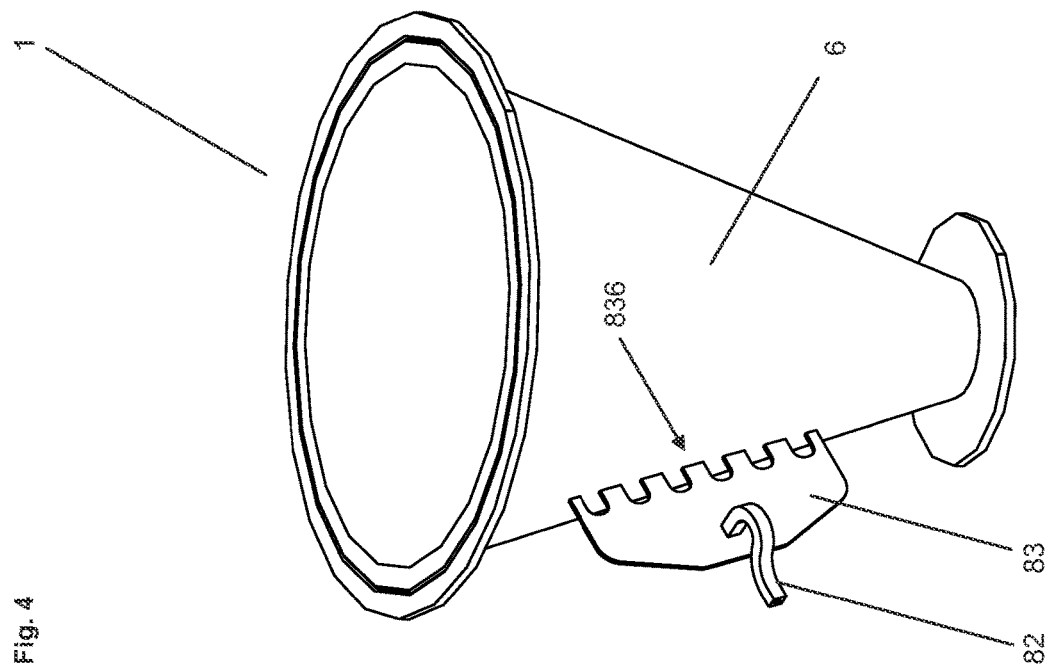

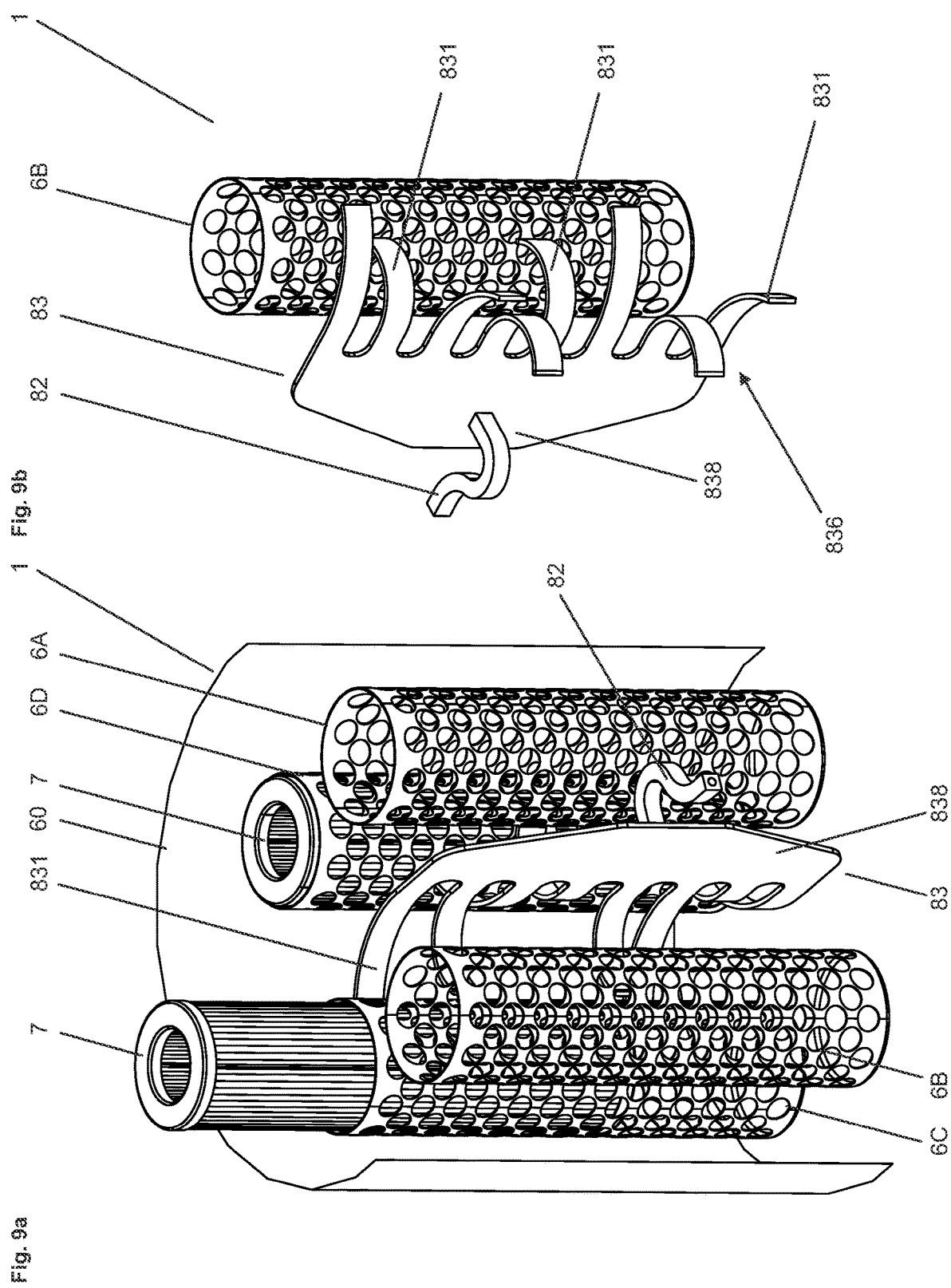

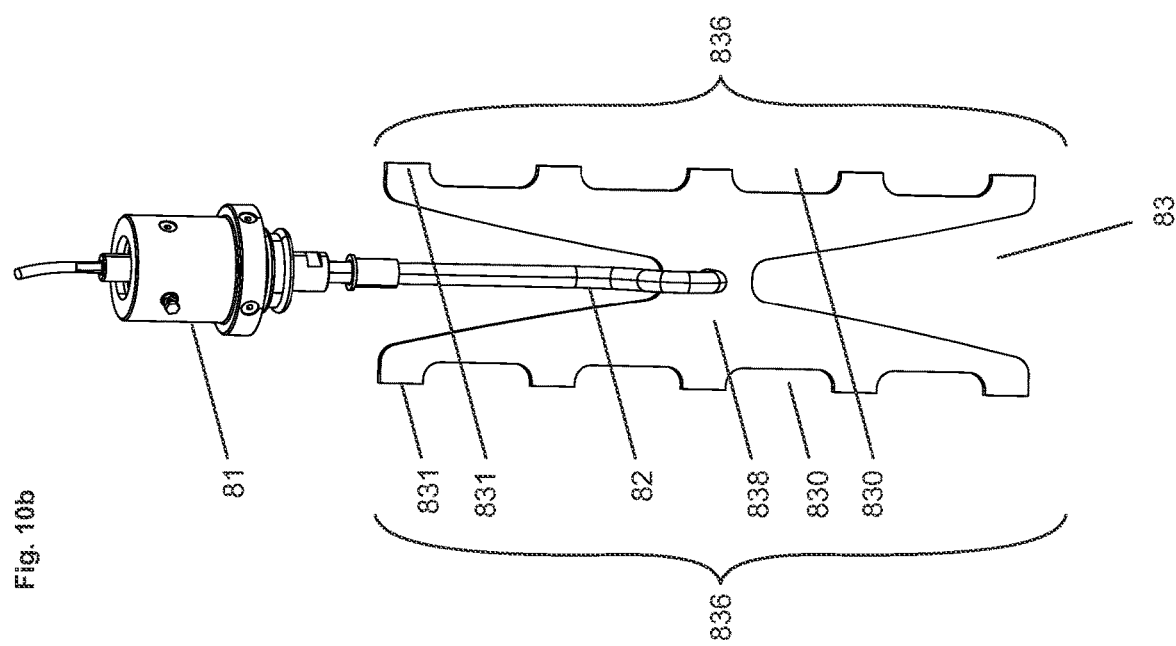
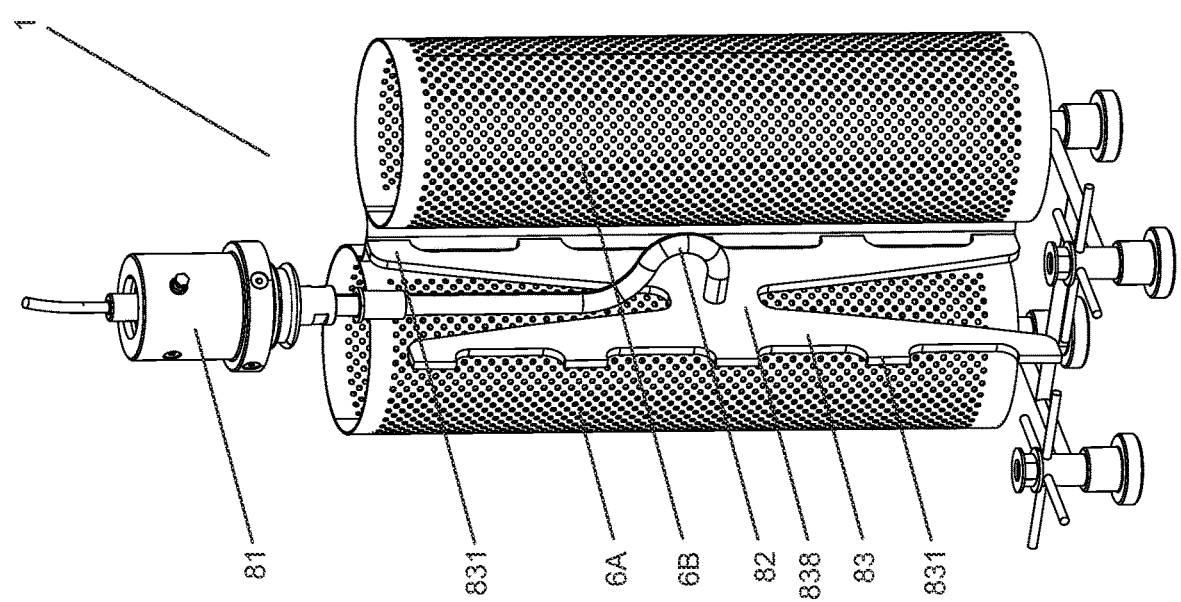
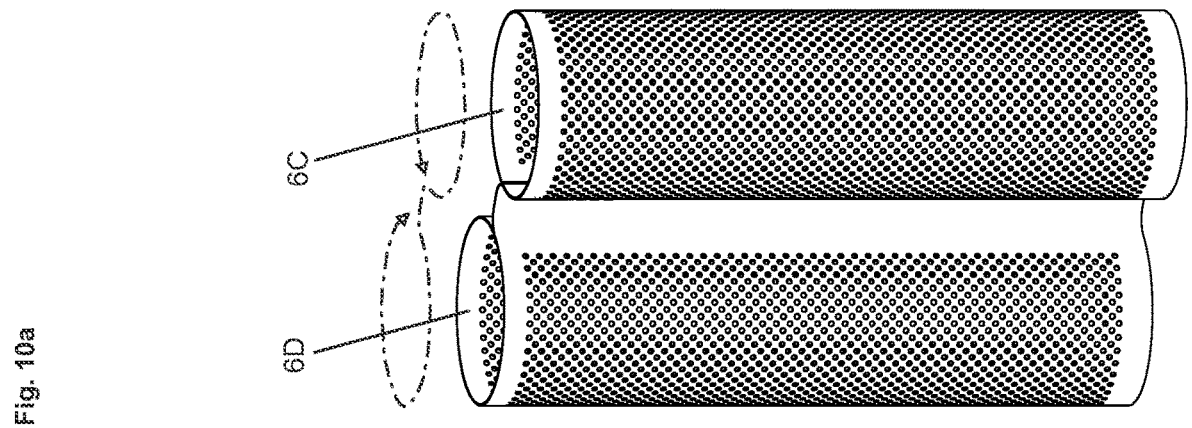
Fig. 10b
Fig. 10a

TRANSPORT DEVICE WITH AN ULTRASONIC GENERATOR AND OPERATING METHOD

The invention relates to a transport device equipped with at least one ultrasonic generator and being designed for the transport of pulverous or granular material and to an operating method for said transport device.

In production processes, especially in the chemical industry, the building materials industry, the pharmaceutical industry and the food industry, materials to be processed are transported and subjected to processing. Powdery or granular materials are dosed, mixed or sieved. In all these processes, the materials and material components are conveyed or transported. These materials are therefore referred to below as process materials.

In screening devices, the process material, e.g., a mixture of solids, is divided into fractions with different particle sizes. The process material is fed to the sieve and the fractions of different grain sizes obtained by sieving are transported away. The screening device is therefore a transport device with a special function, namely a screening function or separation function.

In mixing devices, material components are mixed to form a mixed material. Components of a process material are fed, and the mixed material or mixed process material is transported away. The mixing device is therefore a transport device with a special function, namely a mixing function.

In dosing devices, a process material is dispensed in doses. Dosing devices are therefore also transport devices.

The transport of a process material through a transport device is often associated with difficulties. The process material, which is transported along a partially opened or closed transport frame, can possibly stick to the transport frame, form lumps, not be evenly distributed or not be evenly conveyed. The transport frame is made of metal and encloses or holds the process material so that it can be transported along or through the transport frame. The transport frame can be, for example, a channel, a pipe, or a container. The transport frame can hold a functional element, such as a sieve, which is intended for processing the process material.

Transport devices of this type often do not deliver the desired results in terms of efficiency and quality, e.g., when screening, mixing, dosing or filtering. The separation or mixing of material components or the delivery of the process material regularly does not take place with the desired quality, precision and/or throughput. The quality can be increased by adding further process stages in series. The throughput can be increased by larger systems or by connecting several systems in parallel. More accurate dosing is achieved by more complex systems.

It should also be noted that transport devices of this type often require a high level of maintenance. The process material can stick to the walls of the transport frame or clog the screen lining or a filter, so that they have to be serviced or replaced at an early stage.

WO2018219840A1 describes a screening device with a sieve in which vibrations are transmitted via the sieve frame or transport frame to the sieve lining in order to reduce the problems described. For this purpose, an ultrasonic generator is connected to the transport frame by a coupling rod. Ultrasonic waves reach the screen lining via the transport frame and can set the particles of the process material in motion, so that ideally, they cannot adhere to the transport frame and screen lining. In practice, improvements in this regard are noted in particular when sufficient ultrasonic power can be transmitted to the transport frame. It should be noted that the delivery of high power is normally undesirable, as high temperatures can occur in the area of the connection of the coupling rod with the transport frame, which can damage the connection point. The effect of the coupled ultrasonic waves therefore mainly unfolds in the area of the connection of the coupling rod with the transport frame, which is why its positioning should be chosen accordingly.

It should also be noted that the connection of the coupling rod to the transport frame can only be carried out by appropriately trained personnel. If the connection is not optimal, the results will be unsatisfactory. Furthermore, faulty connections can heat up so that they are destroyed when higher powers are applied.

The present invention is therefore based on the task of creating an improved transport device with an ultrasonic generator and an operating method for this improved transport device.

According to the invention, transport devices are to be improved which are suitable for conveying and/or processing a process material and, if necessary, are equipped for this purpose with one or more functional elements, such as a screen lining or a filter.

In inventive transport devices working processes for processing the process material, such as conveying and/or screening and/or filtering and/or mixing and/or distributing the process material, are to be improved. In particular, the quality and precision of these processes are to be improved. In the case of screening, a more precise separation is to be achieved, in the case of mixing, a better mixing and in the case of dosing, a more precise quantity delivery is to be achieved.

The conveying should be improved in such a way that a more uniform conveying and, if necessary, a more uniform distribution can be achieved. Preferably, the transport direction in which the process material is conveyed should be easily changeable. It should preferably be possible to convey and deliver the process material at selected points.

Furthermore, the throughput should be improved by the transport device without enlarging the system or adding more power.

The transport device should also be easy to assemble, so that systems and transport devices that are already in operation can also be further modified according to the invention.

Furthermore, the transport device should be easy and inexpensive to manufacture.

Furthermore, the maintenance effort for inventive transport devices shall be reduced significantly. Material adhesions, which lead to material losses, impair the material quality and possibly disrupt the operation of the transport device, shall be avoided over a large area and not only at certain points.

This task is solved with a transport device and an operating method as described below. Advantageous embodiments of the invention are discussed below.

The transport device, which serves for the transport of pulverous or granular process material, comprises an open or in itself closed transport frame made of metal, which transport frame is provided for the transport of the process material, which transport frame is held by a support device and which transport frame is connected to an ultrasonic device, which ultrasonic device comprises an ultrasonic generator, an ultrasonic transducer connected to the ultrasonic generator and a coupling rod, which is connected to the ultrasonic transducer and which is having a front end piece and a rear end piece. According to the invention a flat distributor body made of metal is provided, which distributor body has an upper side, a lower side, a rear side and peripherally at least one connection side, wherein the rear end piece of the coupling rod is connected to the ultrasonic transducer and the front end piece of the coupling rod is welded to the rear side, the upper side or the lower side of the distributor body, and that the at least one connection side of the distributor body is integrally connected with or welded to the at least one transport frame.

The transport frame is usually at least partially made of metal so that ultrasonic waves are optimally transmitted from the distributor body to the transport frame. A transport frame closed in itself is, for example, a cone or a tube that has, for example, a round or polygonal cross-section through which the process material is passed. An open transport frame is, for example, a flat or arbitrarily shaped plate or a covering on which the process material can be distributed. The closed or open transport frame can also have openings or pores and, for example, form a sieve coating so that the process material can not only move along the transport frame but also pass through it. A transport frame can therefore fulfil various functions, such as conveying and/or screening and/or separating and/or mixing and/or atomising the process material. To realise these functions, the design and/or orientation of the transport frame can change in the direction of conveyance of the process material. For example, the diameter of the openings of the screen can change in the conveying direction. A process material or different process materials can be fed to the transport frame at one or more points.

The distributor body is preferably plate-shaped. The flat distributor body can have any shape in at least one dimension. The distributor body can be aligned in a plane or have any regular or irregular curvature or shape. The distributor body can thus be a flat plate or flat geometric body, such as a cylinder or a segment thereof. The distributor body can also have any waviness on the upper side and/or the lower side and/or the front or rear side.

The distributor body transmits ultrasonic energy, which is introduced by the coupling rod into the distributor body, along an elongated coupling cross-section to the transport frame. The coupling cross-section is, for example, rectangular with a height corresponding to the panel thickness or with a continuous or uninterrupted irregular course. The transport device according to the invention can thus advantageously act on a process material which is transported over or through the transport frame and, optionally, processed, e.g., sieved, mixed, acted upon with a substance or changed in its structure. The process material is present, for example, as powder or granulate or as a granular mixture. By suitable coupling of ultrasonic energy, particles can be separated and more advantageously transported and processed. In particular, the direction of transport can also be determined by a selective coupling of ultrasonic energy, so that process material is transported in one direction or evenly distributed. Instead of connecting the coupling rod directly to the transport frame and coupling the ultrasonic energy directly into the transport frame, the ultrasonic energy is coupled into the transport frame via the distributor body, which has numerous advantages.

The at least one coupling rod and the distributor body can be made of the same or different metals, such as iron, steel, copper, aluminium or titanium. The coupling rod preferably has a round or polygonal cross-section and is inclined or perpendicular to the rear side, upper side or lower side of the distributor body with the associated end piece. The coupling rod is preferably curved or bent.

The distributor body is flat or extends along a flat or curved surface so that it is connected to the transport frame at the front along a strip or the corresponding cross-sectional course, which preferably has interruptions.

The distributor body can be a metal plate with a homogeneous cross-section or made of interconnected elements such as bar elements. The distributor body can also be a grid plate with bars.

In preferred embodiments, the distributor body has a waviness, so that the intensity of the coupling of the ultrasonic energy along the connection side of the distributor body into the transport frame runs according to this waviness, which leads to a turbulence and loosening of the transported particles of the process material.

The connection side is preferably formed by a usually relatively narrow front side of the plate-shaped coupling body and, if necessary, a bordering edge, since the front side alone is usually not sufficient for creating the welded connection.

The distributor body acts as a transformer that transforms the incoming ultrasonic waves via the coupling rod, distributes them and couples them with increased amplitude into the transport frame. The transformation takes place with regard to the difference between the coupling rod, which has a round or polygonal cross-section, and the flat distributor body.

The connection side of the flat distributor body is connected to the transport frame, optionally with gaps or recesses, so that ultrasonic energy is not coupled into the transport frame at one point, but along a strip or cross-section, which depends on the thickness of the distributor body and the width of the weld seam.

By avoiding a punctual coupling into the transport frame, a punctual heating is avoided, which can lead to a destruction of the connection point or welding point. Thus, more energy can be coupled into the transport frame without fear of damage. The connection point extends over the connection side of the distributor body, which is why heat energy resulting from the welding point or welding seam is absorbed by the transport frame on the one hand and by the transport frame on the other. Even when high power is coupled in, there is no excessive heating that could damage the connection area.

If the coupling rod is connected punctually directly to the transport frame, which is associated with the disadvantages described above, there is therefore a risk of destruction. The welding must therefore be carried out by skilled personnel with the highest quality. This problem is avoided with the inventive solution.

The coupling rod and the distributor body can already be connected to each other in the factory of the manufacturer of the ultrasonic device by a high-quality connection. The connection or welding of the distributor body with the transport frame, on the other hand, can be carried out by non-specialised personnel without any problems. Along the connection side of the distributor body a relatively long, possibly several times interrupted weld seam results, which ensures a secure connection between the distributor body and the transport frame. Even if a part of the weld seam is not optimally executed, the entire weld seam guarantees the desired connection quality. The distributor body, which is connected to the coupling rod, can therefore also be retrofitted by non-specialised personnel to already installed systems or transport frames. Existing systems can therefore be retrofitted in a simple manner.

Particularly advantageous is the use of transport frames that are integrally connected to one or more distribution bodies, which may be plate-shaped. The transport frame can, for example, be punched out of a piece of sheet metal together with one or more distribution bodies and then bent. In this case, an optimal connection between the plate-shaped distribution bodies and the transport frame results. A welded connection between the transport frame and the distributor body is not necessary, which is why the transport device can be manufactured with reduced effort and improved properties at the same time.

The transport frame can be connected to any support device in any manner. The transport frame can be screwed, welded or positively connected to the support device by means of mounting elements.

Preferably, the transport frame is connected to the support device by one or more non-metallic and/or elastic insulation elements. For example, the transport frame is connected to the support device by plastic screw fittings. Between the support device and the transport frame, insulating and/or elastic spacers or holding elements can also be provided, e.g., made of plastic or natural rubber. The transport frame can also be suspended from the support device by means of insulating and possibly elastic ropes. The insulating elements insulate the transport frame mechanically and/or electrically from the support device. Mechanical oscillations, vibrations or coupled ultrasonic oscillations are therefore not absorbed by the support structure. The transport frame therefore forms a vibration system that is only slightly damped and has an optimal effect with relatively little energy input.

Ultrasonic energy can be coupled into a distributor body via one or more coupling rods. Furthermore, several distributor bodies, which can be supplied with ultrasonic energy via one or more coupling rods, can be connected to a transport frame. Ultrasonic energy can therefore be advantageously transmitted to the transport frame as required. The ultrasonic energy can not only be advantageously distributed over the transport frame, but also transmitted alternately or with selected intensity to specific areas of the transport frame. The effect of the ultrasonic energy on the transport frame can be essentially determined by the design of the distributor body.

The transport device can have any transport frame that serves the transport of powdery or granular process material. As mentioned, open or closed transport frames can be used.

A closed transport frame is for example a pipe, a ring, a container, a funnel, a cylinder through which the process material passes. An open transport frame is for example a channel along which the process material is conveyed or on which the process material is processed. The channel can be plate-shaped or, for example, have a U-shaped or V-shaped profile that is suitable for holding the process material. The transport frame is preferably integrated into a process plant and adapted to it.

By appropriate alignment, shaping, dimensions and design of the distributor body, a corresponding course of the coupling of the ultrasonic energy and a corresponding effect on the particles of the process material, which absorb kinetic energy, results. By appropriate design of the distributor body and/or the supply of ultrasonic energy via one or more coupling rods, various beneficial effects can therefore be achieved.

The distributor body can be designed symmetrically, so that a correspondingly uniform coupling of the ultrasonic energy takes place along the connection side of the distributor body. On the other hand, the distributor body can also be designed asymmetrically, so that a corresponding course of the coupling of ultrasonic energy along the connection side of the distributor body results. The distributor body, which is preferably asymmetrical with respect to an axis running perpendicular to the transport frame, is preferably aligned in one or the other direction parallel or inclined to the conveying direction of the process material.

The connection side and the rear side of the distributor body can run parallel or inclined to each other. The coupling along the connection side of the distributor body can be influenced by a corresponding course of the rear side of the distributor body or by a corresponding asymmetrical design of the distributor body.

By shaping the distributor body asymmetrically, it is possible to act on the particles of the process material in order to set them in motion in one direction or the other.

The rear side of the distributor body may also have an undulating shape relative to the connection side of the distributor body, so that the intensity of the coupled energy undulates along the connection side of the distributor body.

A particularly good coupling into the transport frame is achieved when the distributor body is inclined or perpendicular to the transport frame.

The connection side of the distributor body is preferably aligned parallel or inclined to the transport direction of the process material. In preferred embodiments, the connection side of the distributor body runs straight so that, for example, a maximum effect is achieved in the transport direction. For example, the distributor body is aligned parallel to the longitudinal axis of the transport frame, for example a transport channel. In this case, the distributor body typically has a flat surface. It is also possible to realise a waveform that extends along a plane.

Especially with tubular or cylindrical transport frames, the connection side of the distributor body can also run along a curve. For example, at least one distributor body is provided which completely or partially encloses the transport frame as a circular segment, ring segment or spiral.

In preferred embodiments, the distributor body has coupling fingers separated from each other by gaps on the connection side. The coupling fingers can have the same or different dimensions and cross-sections in terms of size or shape. Different degrees of coupling can be achieved by the design of the coupling fingers. For coupling fingers with a larger cross-section, a stronger coupling of ultrasonic energy at the respective position into the transport frame is achieved. With smaller cross-sections, the degree of coupling is reduced accordingly. With round cross-sections, there is a more circular coupling with a corresponding depth effect, while with an elongated cross-section, the coupling of ultrasonic energy takes place over a wider area along the transport frame.

A distributor body that is peripherally provided with coupling fingers can also be advantageously used to distribute ultrasonic energy to several transport frames. At least one coupling finger of the distributor body is connected or welded to each transport frame.

A preferably symmetrical plate-shaped distributor body can also have several wings, each of which has at least one connection side on the periphery. For example, the distributor body has the wing shape of a butterfly.

Furthermore, several distributor bodies, each connected to an ultrasonic generator via at least one coupling rod and one ultrasonic transducer, can be welded to a transport frame. The distributor bodies can be welded to the transport frame on the same or different planes, so that a desired effect of ultrasonic energy occurs in one plane or in a volume section between two planes.

By applying ultrasonic energy typically in the frequency range of 25 kHz to 45 kHz to the transport frame and associated functional elements, such as a screen lining, the particles of the process material are set in motion so that they can be conveyed more easily. Due to the imposed kinetic energy, the particles cannot adhere to the transport frame or the functional elements and are not deposited there. Due to the advantageous coupling by means of the distributor body, the ultrasonic energy can have a broadly distributed effect on the transport frame and any functional units that may be present and prevent the deposition of particles of the process material not only at specific points, but over a large area.

The process material is transported through the transport frame or on the transport frame, e.g., by gravity or by a gaseous medium. The effect of the ultrasonic energy improves the throughput through the transport device without enlarging the plant or adding more power. The particles of the process material that are set in motion can flow more easily and penetrate functional elements, such as a screen lining, more quickly.

In preferred embodiments of the invention, by means of a specific release of ultrasonic energy and, if necessary, by means of a correspondingly designed distributor body, the particles of the process material are acted upon in a targeted manner to move them as desired. The particles can be moved in a specific direction to distribute or release them in a controlled manner. Furthermore, particles can be moved to move them in a circle and to swirl them.

Ultrasonic energy is preferably delivered to the transport frame in such a way that particles of the process material are transported in a certain direction, e.g., optionally in opposite directions forwards or backwards. The process material can therefore be selectively delivered at different points of the transport frame or a functional unit held therewith. The process material can also be guided along a curve and, if necessary, circulated. For example, it is possible to convey the process material upwards along a channel inclined by up to 5° against the force of gravity. In doing so, it is possible to use ultrasonic energy to act on various areas of the transport frame and any functional elements integrated therein. The process material can thus be conveyed in an advantageous manner so that, for example, a uniform particle flow results.

The conveying of particles of the process material by targeted supply of ultrasonic energy allows not only the advantageous transport of the process material, but also an improved separation, sieving or mixing of particles with different properties, such as different sizes, different compositions or different weights. Furthermore, the filtering of the process material in filter units can be optimised. Furthermore, accurate dosing is possible, especially in very small quantities.

Figure 2E:
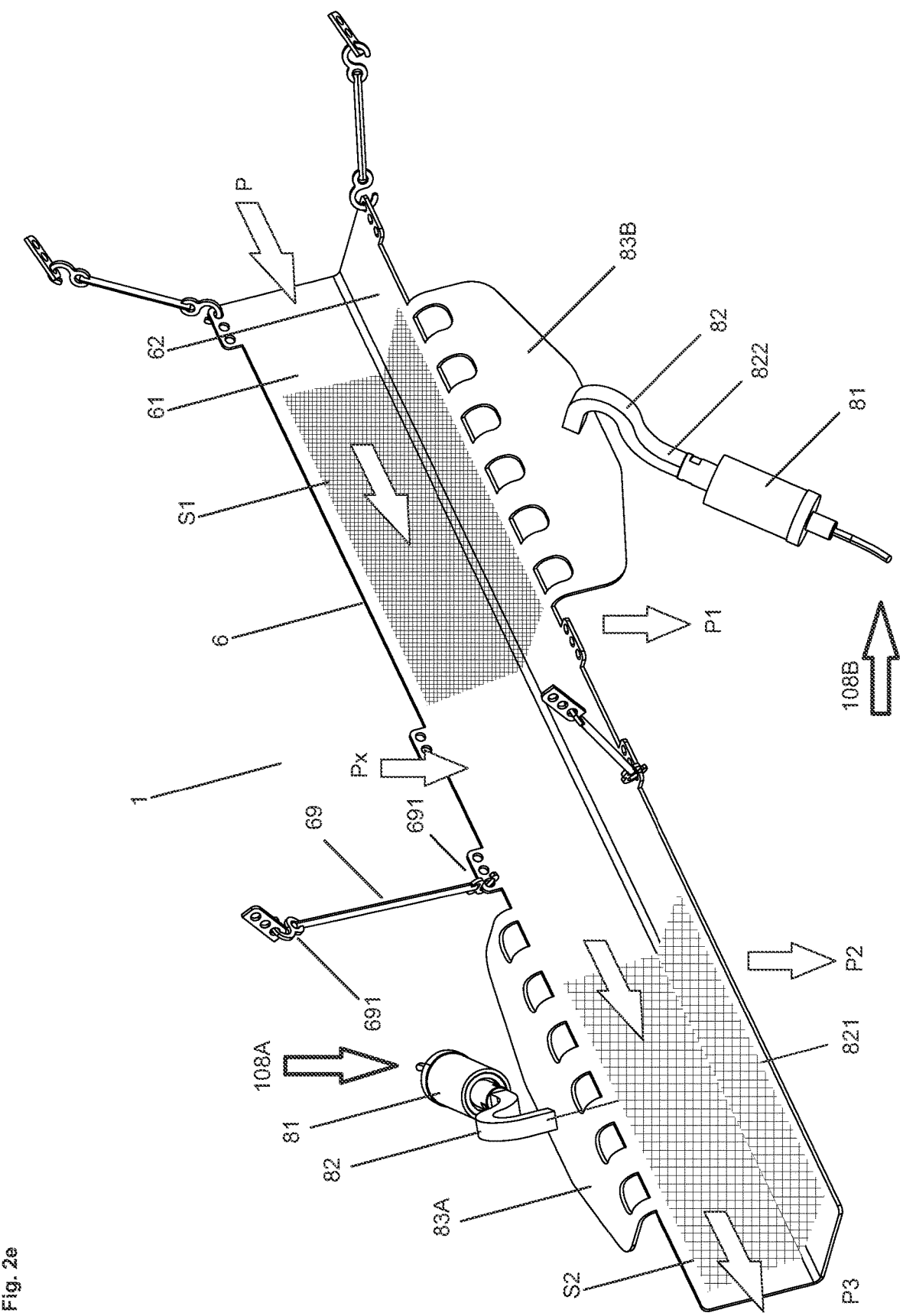
Figure 2F:
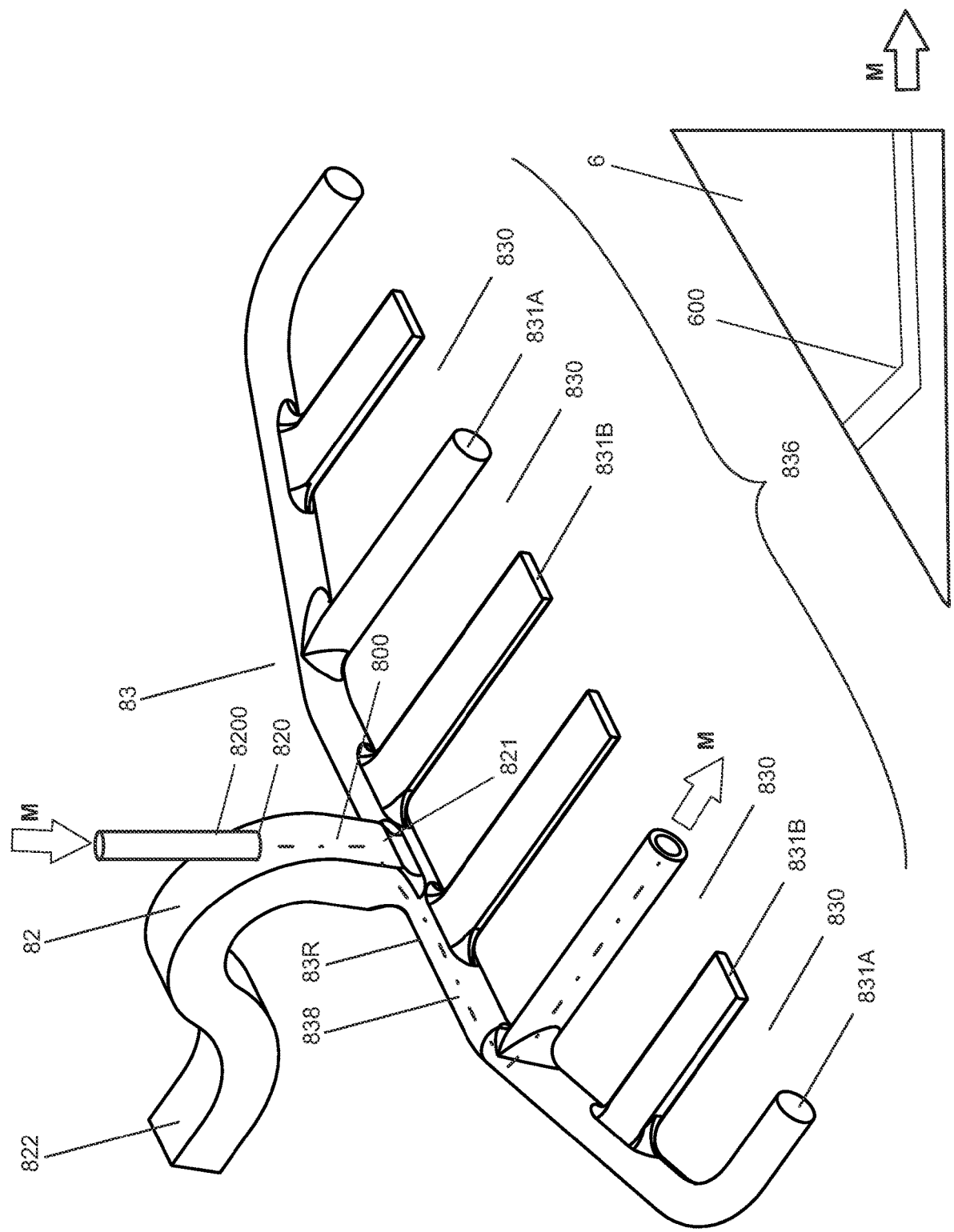
Figure 2G:
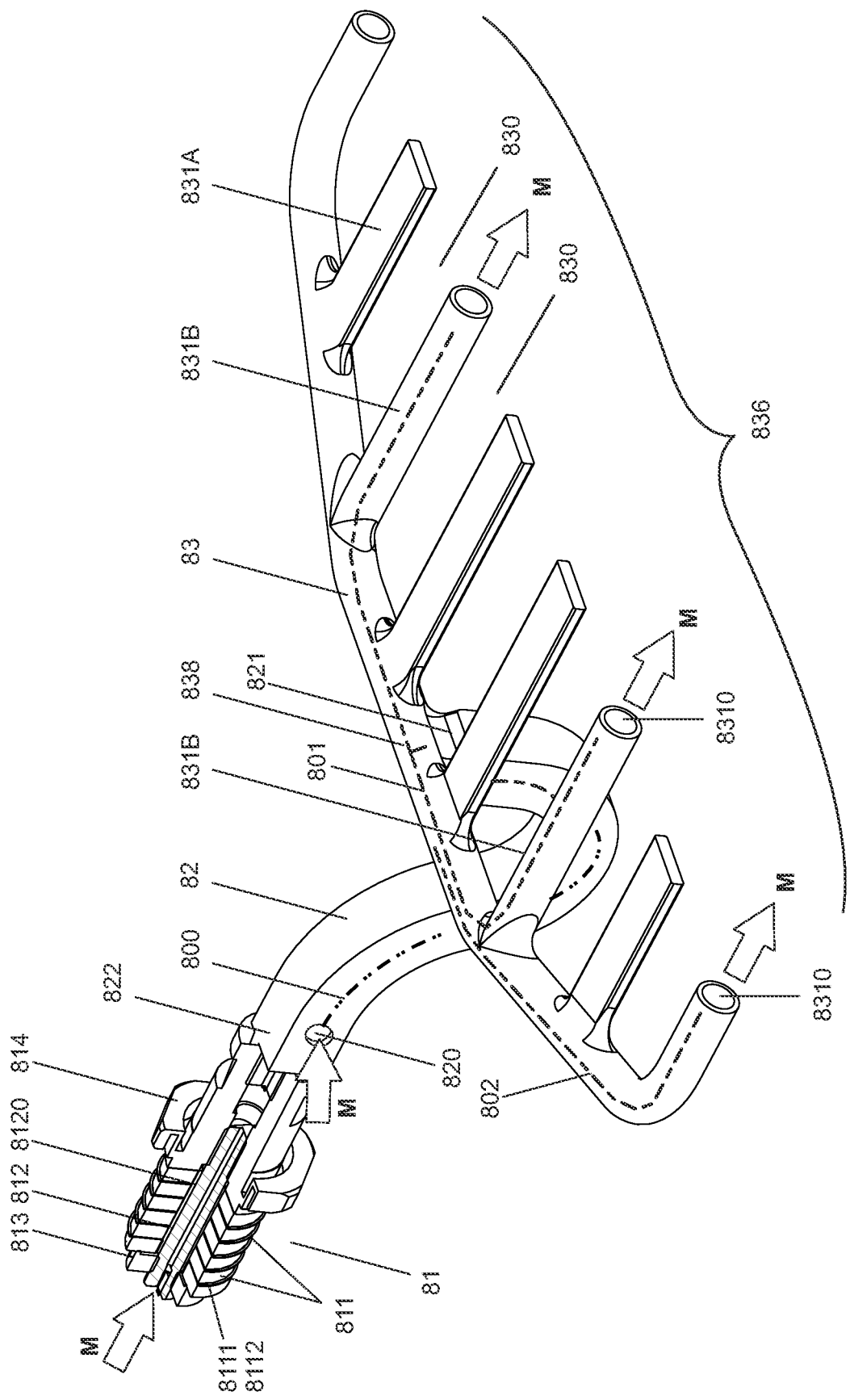
Figure 3:
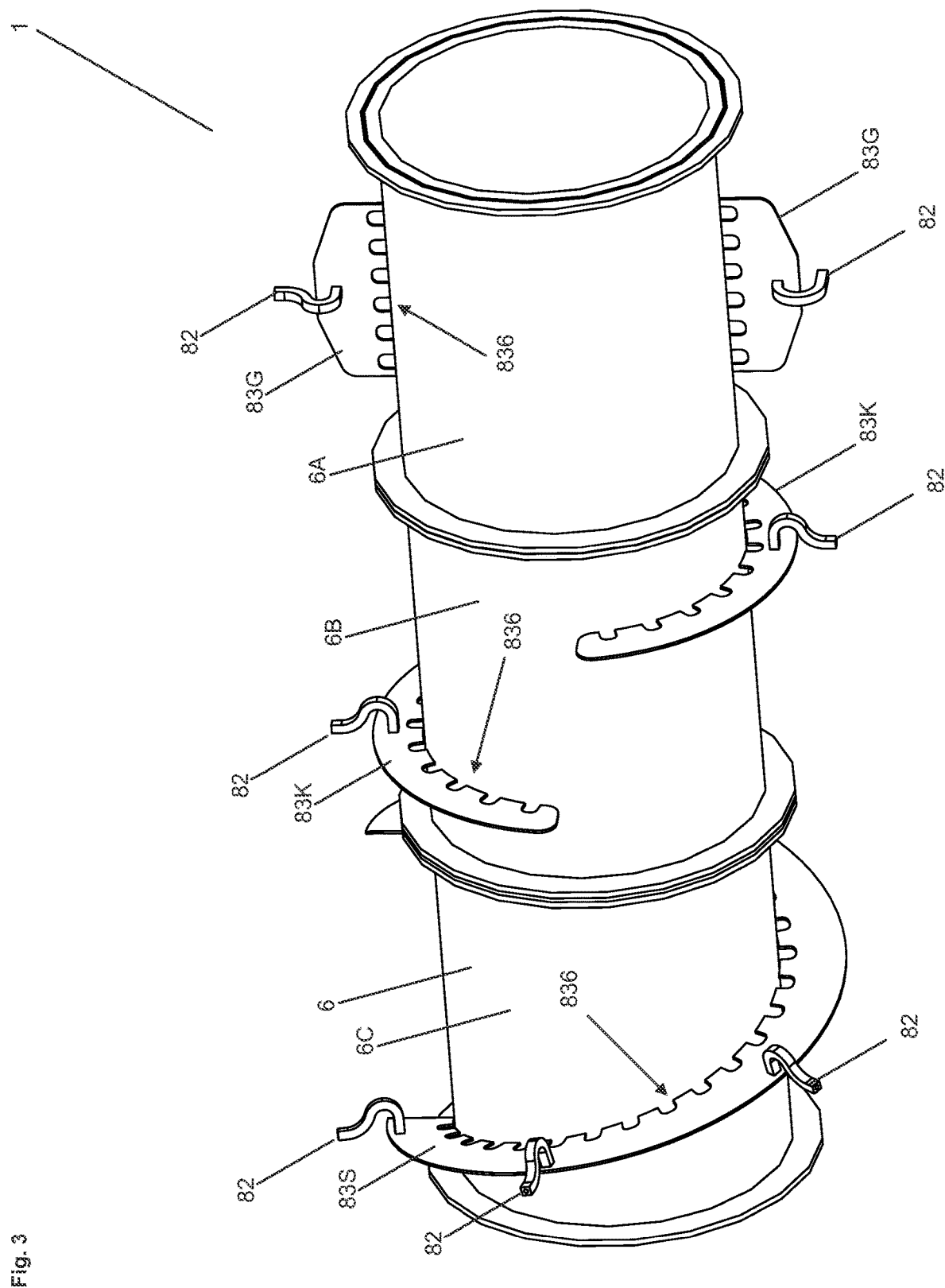
Figure 6:
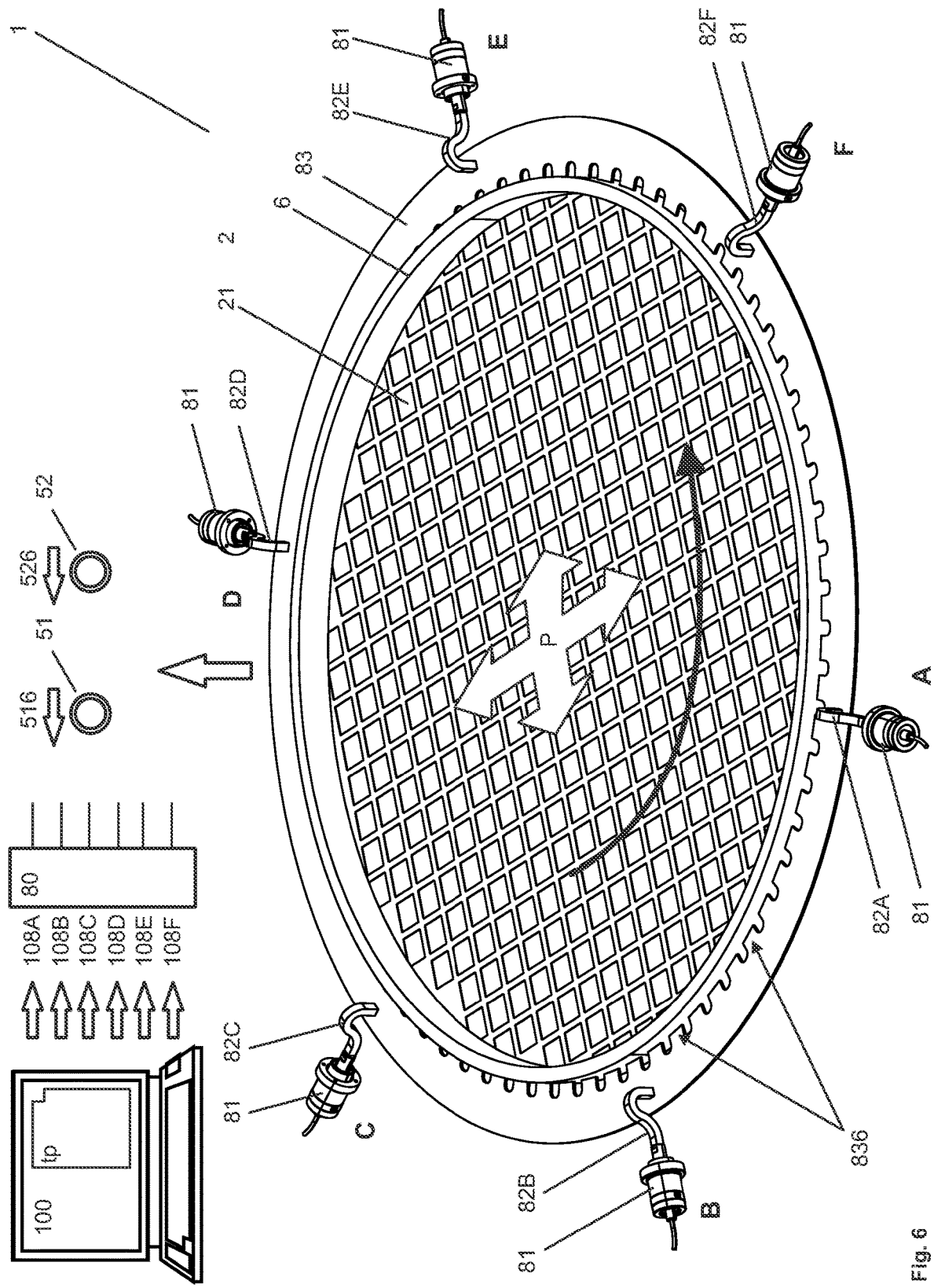
Figure 7:
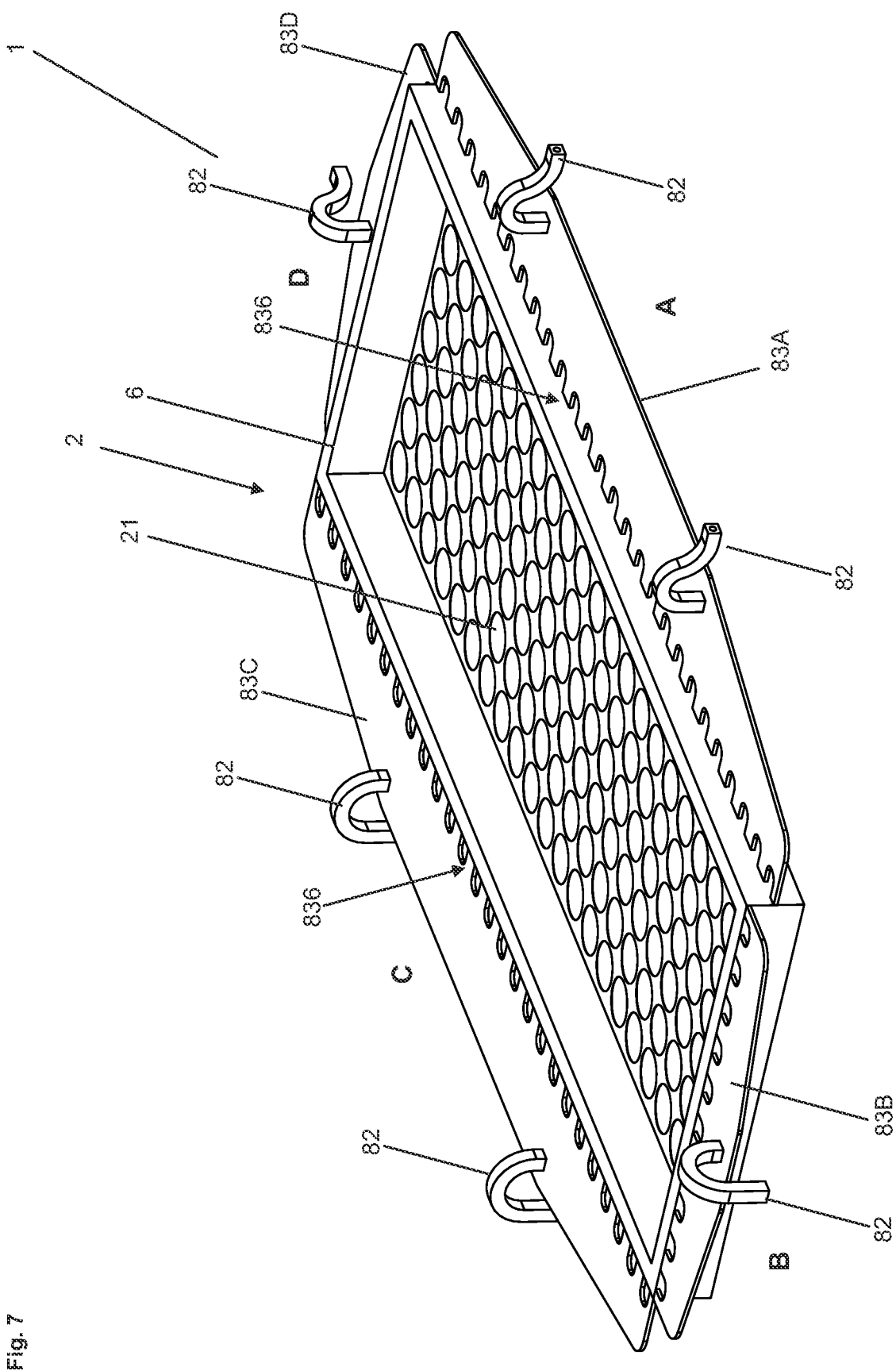
Figure 8:
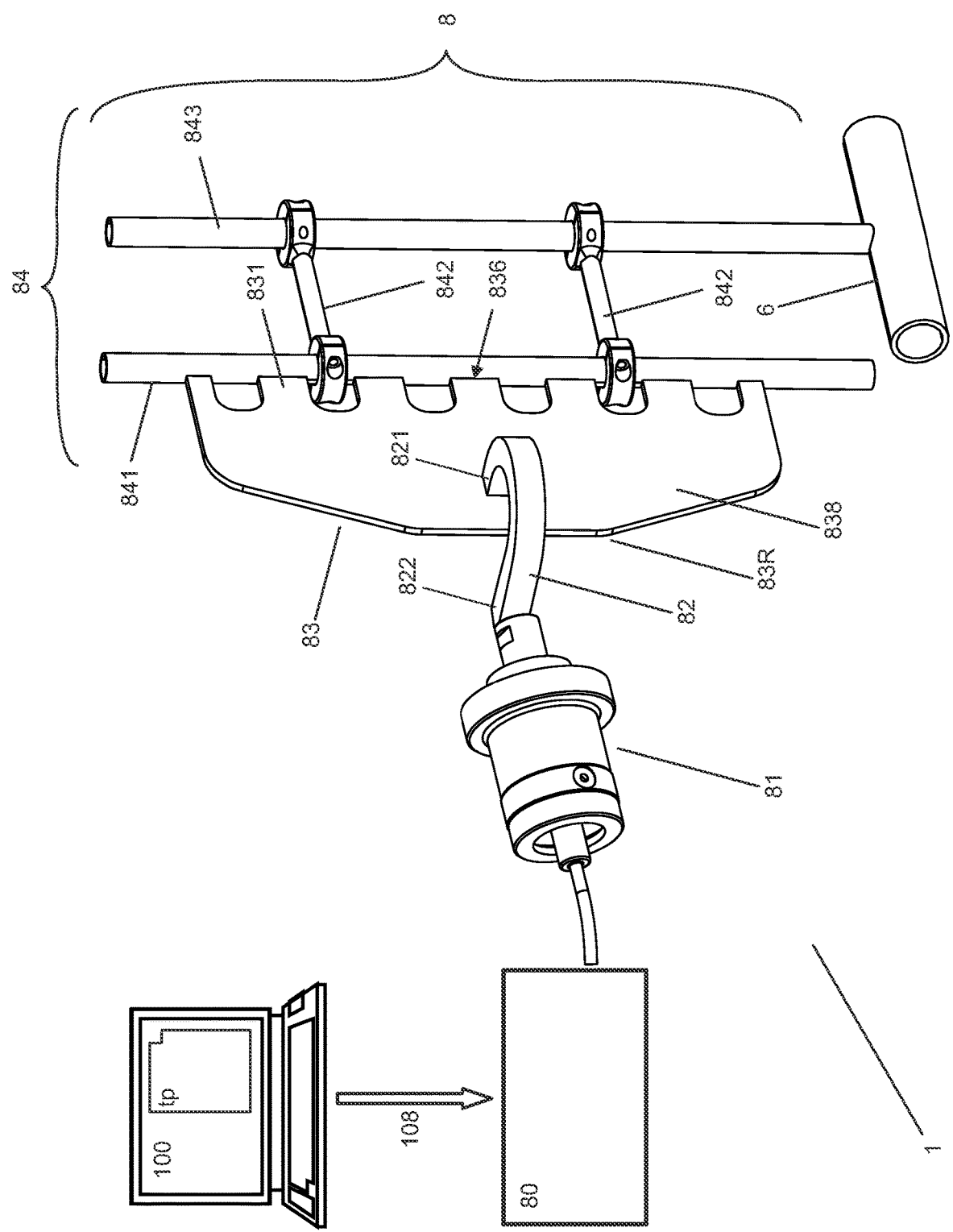
Figure 11:
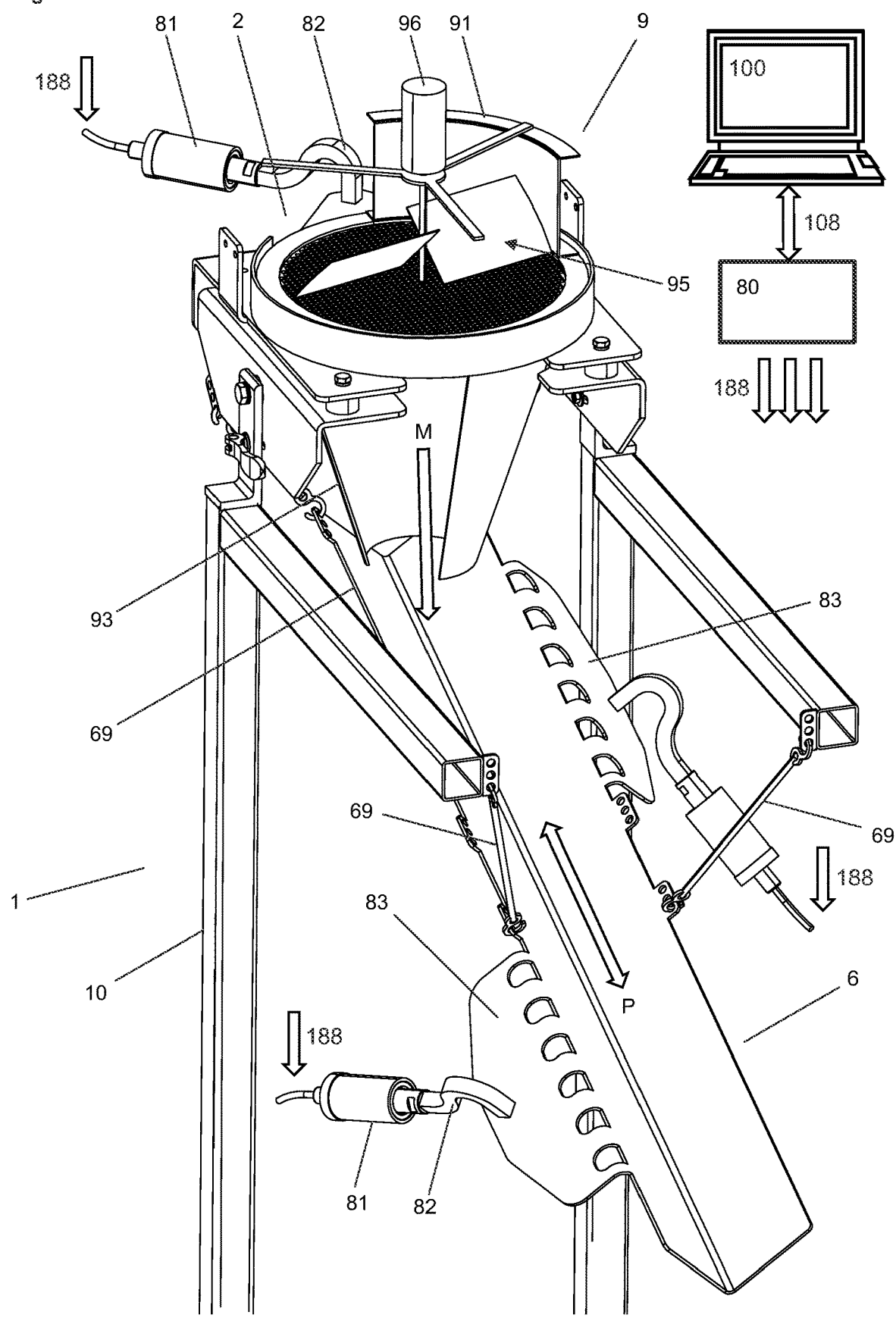

The invention is explained in more detail below with reference to the drawings. Thereby show:

FIG. 1 an inventive transport device 1 comprising a sieve 2 comprising a transport frame 6 holding a rectangular sieve lining 21 connected to an ultrasonic device 8 and hinged to four actuators 31, 32, 33, 34 which are hinged to a support device 10 and by means of which the sieve 2 can be moved within a working volume;

FIG. 2a an inventive transport device 1 in a principal embodiment comprising an ultrasonic device 8 having an ultrasonic generator 80 connected to a transport frame 6 or a part thereof via an ultrasonic transducer 81, a coupling rod 82 and a distributor body 83;

FIG. 2b the transport device 1 of FIG. 2a with a transport frame 6 in the form of an upwardly open V-profile which serves as a conveyor channel;

FIG. 2c the transport frame 6 of FIG. 2b welded on both sides to a distributor body 83 which is curved several times and via which ultrasonic energy can be coupled into the transport frame 6 by means of several coupling rods 82;

FIG. 2d a transport device 1 with the transport frame 6 of FIG. 2b, which is welded on both sides to distribution bodies 83A, 83B, which are aligned antiparallel to one another and are asymmetrical in design, via which ultrasonic energy can be selectively coupled into the transport frame 6 under the control of a control unit 100;

FIG. 2e a transport device 1 with the transport frame 6 of FIG. 2d, which is integrally connected on both sides to symmetrically formed plate-shaped distribution bodies 83A, 83B, via which ultrasonic energy can be selectively coupled into the transport frame 6 under the control of a control unit 100, and with insulation elements 69, by means of which the transport frame 6 can be connected to a support device 10;

FIG. 2f a distributor body 83 which is connected to a coupling rod 82 and which has coupling fingers 831A, 831B which are separated from one another by intermediate spaces 830 and which are differently configured;

FIG. 2g the distributor body 83 of FIG. 2f, which is connected via the coupling rod 82 to an ultrasonic transducer 18 and which serves to pass through a preferably liquid or gaseous medium M, which is introduced through an opening 820 in the coupling rod 82 or through the ultrasonic transducer 81 into the coupling rod 82 and is delivered via the coupling fingers 831B;

FIG. 3 straight shaped distributor bodies 83G, circular segment-shaped distributor bodies 83K and a spiral shaped distributor body 83S, each welded to a tubular or cylindrical transport frame 6A, 6B, 6C;

FIG. 4 a funnel-shaped transport frame 6 to which a distributor body 83 is welded;

FIG. 5 an inventive transport device 1 with a transport frame 6 in the form of a nozzle for the metered delivery of a process material;

FIG. 6 an inventive transport device 1 with an annular or cylindrical transport frame 6, in which a functional element or screen lining 21 is inserted and which is enclosed by an annular distributor body 83, in which ultrasonic energy can be coupled into the transport frame 6 and the screen lining 21 via six coupling rods 82A, . . . , 82F, which are evenly spaced from one another;

FIG. 7 a rectangular transport frame 6 in which a functional element, respectively a screen lining 21, is inserted and which is welded to a distributor body 83A, 83B, 83C, 83D on each side at different heights;

FIG. 8 an inventive transport device 1 with a distributor body 83, which is connected to a tubular transport frame 6 via a coupling device 84;

FIG. 9a a distributor body 83, which is connected by coupling fingers 831 to four cylindrical transport frames 6a, 6B, 6C, 6D, in which cylindrical filter units 7 are inserted;

FIG. 9b the distributor body 83 of FIG. 9a with one of the transport frames 6B;

FIG. 10a a distributor body 83 with two connection sides 836, each of which is connected to two cylindrical transport frames 6a, 6B; 6C, 6D, that are each made in one piece from a sheet of metal;

FIG. 10b the distributor body 83 of FIG. 10a, which has the shape of a butterfly with two wings, on each of which a connection side 836 is provided peripherally; and FIG. 11 an inventive transport device 1 with a screen or sieve 2 and a transport frame 6 according to FIG. 2e, which is suspended from a support device 10 by rope-shaped insulation elements 69.

FIG. 1 shows an inventive transport device 1 in a preferred embodiment with a screen 2, which comprises a transport frame 6, which holds a rectangular screen lining 21 and which is connected by joints 312, 322, 332, 342 each to a piston rod of four actuators 31, 32, 33, 34, which are connected by joints 311, 321, 331, 341 to a support device 10. The support device 10 comprises four columns connected to the actuators 31, 32, 33, 34, which are connected to each other by cross struts.

The actuators 31, 32, 33, 34 are part of a drive device 3, which additionally comprises media lines 313, 323, 333, 343, via which for example electrical energy or a hydraulic or pneumatic medium can be transmitted from a source 30 to the actuators 31, 32, 33, 34.

The transport frame 6 is also connected to an ultrasonic device 8, which comprises an ultrasonic generator 80 that transmits ultrasonic energy to the transport frame 6 via an ultrasonic transducer 81, a coupling rod 82 and a distributor body 83. The ultrasonic generator 80 generates electrical AC voltage signals in the ultrasonic range of for example 25 kHz to 45 kHz. The alternating voltage signals are fed in the ultrasonic transducer 81, for example to piezo elements, which are firmly connected to the coupling rod 82, for example by a coupling bar. The electrical AC voltage signals are converted into mechanical vibrations by the piezo elements and transmitted to the transport frame 6 via the coupling rod 82 and the distributor body 83.

The transport frame 6 is rectangular and arranged in such a way that the process material P can pass through it. The transport frame 2 holds a functional element, namely the screen lining 21. The screen lining 21 is preferably made of metal and mechanically connected, preferably welded, to the transport frame 6. Ultrasonic energy transmitted to the transport frame 6 can therefore penetrate into the screen lining 21 and act there on the process material P.

The dimensions and functions of the transport frame 6 are chosen according to the function of the transport device 1, which can be for example a feeding device, a screening device, a mixing device, or a dosing device.

All these devices comprise a correspondingly designed transport frame 6 through which the process material is guided or on which the process material is stored and/or transported. In the embodiment of FIG. 1, the transport frame 6 encloses a cross-section through which the process material P is guided. However, the transport frame 6 can also limit the transport path only on one or more sides, as shown for example in FIGS. 2a and 2b. Furthermore, the transport frame 6 can have a minimum length which is required, for example, for holding the functional element, e.g., the screen lining 21. Alternatively, the transport frame 6 can extend over longer distances, e.g., several metres, as shown in FIG. 3.

It is essential that the ultrasonic energy can act on the process material P via the transport frame 6 and, if necessary, at least one functional element in order to set it in motion and, in particular, to prevent a deposition on the transport frame 6 and on the optional functional elements.

The process material P is a pulverous or granular material, such as a powder or granules. The particles of the powder or granules can be of the same or different composition. The process material P may have one or more components. For example, a process material P consisting of several components is supplied divided into components and/or dispensed in doses.

Multiple components of a process material P may also be supplied separately and mixed and/or dispensed in a dosed manner. The particles of the process material P can have any chemical or pharmaceutical composition.

For individual control of the individual actuators 31, 32, 33, 34, the drive device 3 is connected via communication lines, in particular control lines 101, to a control unit 100, in which a control computer with an operating programme is provided. The ultrasonic generator 80 can also be controlled via a control line 108. Preferably, the ultrasonic generator 80 is designed and controllable in such a way that ultrasonic signals with selected frequencies within the ultrasonic spectrum of, for example, 25 kHz to 45 kHz can be selectively emitted. Optionally, the frequency can be swept or continuously changed so that standing waves are avoided. Furthermore, the ultrasonic energy shall be able to be selectively emitted in intervals.

The control unit 100 can also be supplied with measuring signals 511, 521 from sensors 51, 52 as well as status signals 109 from a feed device 9 (shown schematically by an arrow pointing downwards), from which the process material P reaches the screen lining 21. The sensors 51 and 52 are optical sensors, e.g., imaging sensors, by means of which the distribution of the process material P that has reached the screen lining 21 is monitored.

Controlled by the control unit 100, the screen 2 can be subjected to almost any movement within a working volume by means of the actuators 31, 32, 33, 34, e.g., linear drives with a piston rod. The sieve 2 can be displaced at least along its transport axis x and/or its transverse axis y and/or rotated about an axis of rotation z which is preferably perpendicular to these axes x, y.

The actuators 31, 32, 33, 34 are preferably connected to the transport frame 6 and the support device 10 by ball joints 312, 322, 332, 342; 311, 321, 331, 341, which allow the actuators 31, 32, 33, 34 to rotate unrestrictedly in any direction to the required extent. When the piston rod of one of the actuators 31, 32, 33, 34 is extended, the other actuators 31, 32, 33, 34 can therefore rotate as required.

The actuators 31, 32, 33, 34 perform a coarse distribution. By supplying ultrasonic energy, this coarse distribution is supported and a fine distribution takes place in addition. Through the effect of the ultrasonic energy, an air cushion is formed through which the process material P can be distributed without resistance. The process material P is decoupled from the transport frame 6 and the functional element or screen lining 21 and cannot adhere to them. Therefore, there are no deposits that would cause extra maintenance. On the other hand, particles of corresponding size can quickly pass through the screen lining 21 under the influence of the ultrasonic energy.

Inventive transport devices 1 can therefore, as shown in FIG. 1, optionally comprise any mechanical drives and are not limited to the supply of ultrasonic energy alone. In many cases, however, the inventive supply of ultrasonic energy alone is sufficient to realise the advantages of the invention.

By coupling the ultrasonic energy via the coupling rod 82 and the distributor body 83, which is welded to the transport frame 6, the ultrasonic energy is coupled into the transport frame 6 along the connection side of the distributor body 83 rather than at a specific point. Problems resulting from the conventional punctual coupling of the ultrasonic energy are avoided. Even with the coupling of high powers, no damage occurs to the connection point. As described above, the distributor body 83, which is supplied with the coupling rod 82 already welded on, can be welded to the transport frame 6 in a simple manner. The distributor body 83 acts as a transformer and couples ultrasonic waves with increased amplitude into the transport frame.

The distributor body 83 can be welded to a transport frame 6, such as a pipe, a duct, a container or the like, by non-specialised personnel, even if the equipment is already installed and in operation. High temperatures occurring at certain points are avoided. Instead, the heat energy is preferably absorbed over the entire length of the transport frame 6 and the distributor body 83.

FIG. 2*a* shows an inventive transport device 1 in a principal embodiment with an ultrasonic device 8 comprising an ultrasonic generator 80, which is connected to a transport frame 6 or a part thereof via an ultrasonic transducer 81, a coupling rod 82 and a distributor body 83. The coupling rod 82 is bent and stands with its front end piece 821 perpendicular to the distributor body 83, preferably a metal plate, and is welded to it. In this case, the upper side 83U of the distributor body 83 forms a coupling side or the transition piece 838 to which the coupling rod 82 is welded. However, the coupling rod 82 can also be connected to the lower side 83L or to a rear side 83L of the distributor body 83, if this is wide enough.

The rear end piece 822 of the coupling rod 82 is connected to the ultrasonic converter 81, which has, for example, a coupling bar coupled to piezo elements. Electrodes are arranged between the piezo elements to which an alternating voltage signal is applied.

The distributor body 83 is symmetrical and has a connection side 836, an upper side 83U and a lower side 83L. The connection side 836 comprises seven coupling fingers which are separated from each other by U-shaped recesses 830. The coupling fingers 831 are welded to the transport frame 6. The transport frame 6 is symbolically shown as a plate and can be configured in any way to receive and deliver a process material P. The transport frame 6 can, for example, be a plate. The transport frame 6 can, for example, be an at least approximately horizontally aligned plate on which the process material P is placed in order to mix, separate and/or dispense it in a dosed manner.

These processes are supported by the targeted supply of ultrasonic energy. For this purpose, a control unit 100 with a control programme tp is provided, by means of which control signals 108 are emitted to the ultrasonic generator 80 in order to emit ultrasonic signals with the desired frequency and amplitude, possibly a sequence of ultrasonic signals, or a mixture of ultrasonic signals. As mentioned, the ultrasonic signals introduced into the distributor body 83 are amplified and delivered with increased amplitude via the connection side of the distributor body 83 to the transport frame 6. The arrangement of coupling fingers 831 and intervening recesses 830 makes it possible to act non-uniformly on the process material P and to move and swirl it along virtually the entire length of the transport frame 6.

FIG. 2*b* shows the transport device 1 of FIG. 2*a* with a transport frame 6 serving as a channel in the form of an upwardly open V-profile. The transport frame 6 is preferably horizontally aligned or slightly inclined. Under the influence of ultrasound over a wide range, the process material P can move along the transport frame 6 as if on a cushion of air. The transport frame 6 can thus form a transport channel that can extend in any direction.

FIG. 2*c* shows the transport frame 6 of FIG. 2*b* with a multi-curved distributor body 83. The distributor body 83, which has four curved edges, is connected at both ends with connection sides 836 to the transport frame 6 and to one side 61, 62 of the channel formed by the transport frame 6 respectively. On both sides, the distributor body 83 is welded with two coupling rods 82 each, via which ultrasonic energy with high power can be coupled into the transport frame 6.

FIG. 2*d* shows the transport frame 6 of FIG. 2*b* in the form of a channel which is welded on both sides to distributor bodies 83A, 83B which are aligned antiparallel to each other and are asymmetrical. Via the two distributor bodies 83A, 83B, which are each connected to an ultrasonic generator 80 via a coupling rod 82 and an ultrasonic converter 81, ultrasonic energy of any frequency and amplitude can be coupled into the transport frame 6 by a control unit 100 either via one distributor body 83A or the other distributor body 83B or jointly via both distributor bodies 83A, 83B.

Due to the asymmetric design and anti-parallel alignment of the distributor bodies 83A, 83B, ultrasonic energy can be coupled into the transport frame 6 with corresponding gradients. Accordingly, the particles of the process material P are set in motion differently and start to move in one or the other direction depending on the type of coupling. If the coupling takes place antiparallel via both distributor bodies 83A, 83B, the process material P is swirled and conveyed according to the inclination of the transport frame 6. However, a movement in one or the other direction is also possible if ultrasonic energy with different power is coupled in via the distributor bodies 83A, 83B. In this case, movement and turbulence can occur simultaneously. For example, the transport device 1 serves as a mixing device.

For example, the process material P can be dispensed first in direction A and then in direction B. Due to the type and the change of the coupling of the ultrasonic energy, a dosed delivery of the process material P in one or the other direction is possible. The material flow can be started and also stopped again. The intensity of the material flow can be controlled by the intensity of the coupling.

FIG. 2*e* shows the transport frame 6 of FIG. 2*d*, which is integrally connected on both sides with symmetrically formed plate-shaped distribution bodies 83A, 83B. The transport frame 6 has been cut or punched out of a single piece of sheet metal and bent into the present shape. The distributor bodies 83A, 83B allow the optimal coupling of ultrasonic energy via several coupling fingers. The distributor bodies 83A, 83B may also have an asymmetric shape with any orientation, so that all functions described for other embodiments of the invention are also achievable. Conversely, the transport frame 6 of all other embodiments of the invention can also be integrally connected to the optionally plate-shaped distributor body 83.

The coupling of ultrasonic energy into the transport frame 6 is preferably carried out as described e.g., with reference to FIG. 2*d*.

Exemplarily, it is shown that the transport frame 6 optionally comprises a first and a second screen layer S1, S2, which are realised by openings or bores with different diameters. Between the two screen layers S1, S2 a mixing zone is optionally provided, within which a further process material Px can be fed. A process material P can therefore be conveyed, screened or separated into portions, mixed or charged with additional further process material Px, screened or separated again and discharged. The fed process material P thus results in separated process material portions P1 and P2 and a process material portion P3, which is discharged at the end of the transport frame 6. By means of appropriately designed transport frames 6, numerous functions can be realised individually or in combination with each other.

The transport frame 6 is connected by mounting elements 691 to four rope-shaped insulation elements 69, by means of which the transport frame 6 can be connected to a support device 10. The transport frame 6 of FIG. 2d can, for example, be used with the transport device 1 of FIG. 11.

FIG. 2f shows a distributor body 83 connected to a coupling rod 82, which distributor body 83 has coupling fingers 831A, 831B separated from each other by gaps 830, which are designed differently. In this way, any pattern of coupling of ultrasonic energy can be created which is suitable for the process at hand, e.g., mixing process, separation process or conveying process.

FIG. 2f further shows that the coupling rod 82 can also be welded to the rear side 83R of the distributor body 83.

Furthermore, it can be seen that the connection side 800 of the distributor body 83 is several times larger than the diameter of the coupling rod 82. This ratio can be in any range from, for example, 5-50 or more, especially 10-25.

The coupling rod 82 and the transport frame 83 can be solid with closed cross-sections. Alternatively, the coupling rod 82 and/or the distributor body 83 can also be provided with at least one through channel or distribution channel 800. Several distribution channels 800 can be provided, which are connected to each other or run separately from each other. In FIG. 2f an optional through channel or distributor channel 800 is shown, which runs through a part of the coupling rod 82 and through a part of the distributor body 83 to a coupling finger 831B. A metal connection tube 8200 is connected to a connection opening 820, through which a liquid or gaseous medium M is introduced. Coupling rods 82 and/or distributor body 83 and/or transport frame 6 according to the invention can therefore be provided with individual channels or with a channel system through which the transport frame 6 itself or the transported process material P is acted upon. FIG. 2f shows an example of a transport frame 6 with a distribution channel 600 of any shape, to which the medium M is fed from the distributor body 83, which runs inside the transport frame 6 to an outlet opening and is fed to the process material P if necessary. The distribution channel 600 running within the transport frame 6 can also have several outlet openings, for example in order to mix or swirl a process material P with a liquid or a solid. A gaseous medium can therefore carry a powdery substance that is mixed into the process material P.

FIG. 2g shows the distributor body 83 of FIG. 2f, which is connected via the coupling rod 82 to an ultrasonic transducer 18 and is used to convey a preferably liquid or gaseous medium M and is therefore completely or partially tubular or is provided with distribution channels 800. In the embodiment shown, the medium M, for example air, gas or a liquid, can, if provided, optionally be introduced through the ultrasonic transducer 18 and/or, if provided, optionally be introduced through an opening 820 in the coupling rod 82 into the coupling rod 82 and be guided through distribution channels 800 of the distributor body 83 to an outlet on one or more of the coupling fingers 831B.

Inventive distributor bodies 83 in preferred embodiments therefore comprise one or more distribution channels 800 through which at least one medium M can be transferred to and/or into the transport frame 6. For example, a liquid medium can be supplied to the transport frame 6 through a first distribution channel 800 in order to cool it. A second medium M, a gas or a liquid, can be introduced into the transport frame 6, for example, in order to influence the conveyed process material P mechanically or chemically. The process material P can be swirled, impacted or mixed by the supplied medium M, for example.

FIG. 2g shows that the medium M is introduced through an opening 820 in the coupling rod 82 or through the ultrasonic transducer 81 into the coupling rod 82 and delivered via the coupling fingers 831B. One of the distribution channels 800 is shown with a dotted line.

The ultrasonic transducer 81 comprises ring-shaped piezo elements 811, which are placed on a mounting shaft 812 and clamped between flange elements 813, 814. The flange element 813 is, for example, a screw nut that is screwed onto the mounting shaft 812. Contact discs 8111 and/or insulation discs 8112 are provided between the piezo elements 811. By applying alternating voltages, preferably in the ultrasonic range, to the piezo elements 811, they are excited to mechanical vibrations. Ultrasonic vibrations are therefore transmitted from the ultrasonic transducer 81 via the coupling rod 82 and the distributor body 83 to the transport frame 6. The mounting shaft 812 is provided with a transfer channel 8120, which passes axially through the mounting shaft 812 and thus through the ultrasonic transducer 81. A medium M can therefore be applied to the inlet of the transfer channel 8120 and fed to the inlet of the tubular coupling rod 82.

In a preferred embodiment, a first medium M could therefore be passed through the ultrasonic transducer 81 to a first coupling finger 831B and a second medium M could be passed through the opening 820 in the coupling rod 82 to a second coupling finger 831B.

Distribution channels 800 can also be advantageously realised in plate-shaped distribution bodies 83. For example, two complementary metal plates with channel structures are connected to each other in such a way that the distribution channels 800 are enclosed between them and connected, for example, to an access channel that connects to a through channel of the coupling rod 82.

FIG. 3 shows straight-shaped distributor bodies 83G welded to a first tubular transport frame 6A, circular-segment-shaped distributor bodies 83K welded at different heights to a second tubular transport frame 6B, and a spiral-shaped distributor body 83S welded to a third tubular transport frame 6C. The helical distributor body 83S is connected to a plurality of coupling rods 82 and allows ultrasonic energy to be coupled into the third tubular transport frame 6C along its entire length and circumference. Tubular transport frames 6 can be connected in any way with, for example, straight-shaped distributor bodies 83G and/or circular segment-shaped distributor bodies 83K and/or spiral-shaped distributor bodies 83S.

FIG. 4 shows a transport device 1 with a funnel-shaped transport frame 6 to which a distributor body 83 is welded.

FIG. 5 shows an inventive transport device 1 with a tubular transport frame 6, to which a slightly upwardly inclined nozzle 69 is connected. Under the influence of ultrasonic energy, the process material P can be dispensed in doses through the nozzle 69. Kinetic energy is imparted to the process material P so that it can move slightly upwards and emerge from the nozzle 69. A dotted line shows that the distributor body 83 can be symmetrical or asymmetrical.

FIG. 6 shows an inventive transport device 1 with an annular or cylindrical transport frame 6 in which a functional element, i.e., a screen lining 21, is inserted. The transport frame 6 is enclosed by an annular distributor body 83, into which ultrasonic energy can be coupled into the transport frame 6 and the screen lining 21 via six evenly spaced coupling rods 82A, . . . , 82F. The control unit 100 outputs corresponding control signals 108A, 108B, 108C, 108D, 108E, 108F to the ultrasonic generator 80 so that ultrasonic energy can be imposed with any gradient into the transport frame 6 and the screen lining 21. Via the coupling rods 82A, . . . , 82F, any constant or arbitrarily changing and moving energy patterns can be imposed on the screen lining 21.

According to these energy gradients and energy patterns, the process material P moves and circulates on the screen lining 21 in arbitrary directions. The movement of the process material P can be monitored by optical sensors 51, 52 and reported back to the control unit 100 so that the control unit 100 can move and displace the process material P according to its programme tp.

The injection of ultrasonic energy running along gradients is therefore possible not only by asymmetric design of the distributor body 83, but also by corresponding coupling of ultrasonic energy via the coupling rods 82A, . . . , 82F.

FIG. 7 shows a rectangular transport frame 6 in which a functional element or screen lining 21 is inserted and which is welded on each side, at different heights, to a distributor body 83A, 83B, 83C, 83D. The longer distributor bodies 83A and 83C are each welded to two coupling rods 82. The two shorter distributor bodies 83B and 83D are each welded with only one coupling rod 82.

FIG. 8 shows an inventive transport device 1 with a distributor body 83, which is connected to a tubular transport frame 6 via a coupling device 84. The distributor body 83 couples ultrasonic energy into a coupling bar 841, from which ultrasonic energy can be distributed to several transport frames 6. A tubular transport frame 6 is shown, which is connected to a connection bar 843, to which ultrasonic energy can be supplied from the coupling bar 841 via transfer bars 842.

By means of one or more transfer bars 842, ultrasonic energy can thus be guided from the coupling bar 841 to several connection bars 843 or directly to several transport frames 6. The dimensions and cross-sections of the transfer bars 842 allow the energy flow of the ultrasonic energy to be adjusted as required.

FIG. 9a shows a distributor body 83 which is connected by coupling fingers 831 to four cylindrical transport frames 6a, 6B, 6C, 6D in which cylindrical filter units 7 are inserted. Through the coupling fingers 831, which form the connection side 836 of the distributor body 83, ultrasonic energy can thus be transmitted to various transport frames 6. One of the filters 7 is partially pulled out. In two of the transport frames 6a, 6B the filters 7 are not yet inserted. The device is arranged inside a container 60, for example.

This embodiment of the invention also shows the advantages of the distributor body 83, which allows ultrasonic energy to be transformed and advantageously distributed.

FIG. 9b shows the distributor body 83 of FIG. 9a with one of the transport frames 6B.

FIG. 10a shows a distributor body 83 with two connection sides 836, each of which is connected to two cylindrical transport frames 6a, 6B; 6C, 6D, that are each made in one piece from a sheet of metal. The sheet metal can be pre-machined, e.g., provided with openings and then bent to obtain a desired e.g., round, rectangular, triangular or polygonal cross-section. Between the two transport frames 6a, 6B; 6C, 6D a connecting piece remains to which the distributor body 83 can be welded.

FIG. 10b shows the distributor body 83 of FIG. 10a, which has the shape of a butterfly with two wings, on each of which a connection side 836 is provided peripherally. The distributor body 83 can also have further wings, which preferably enclose equal angles to each other.

The coupling rod 82 is welded to a transition piece 838 between the two wings and runs with its end piece perpendicular to the front or rear side of the plate-shaped distributor body 83. The end piece of the coupling rod 82 connected to the ultrasonic transducer 81 extends axially parallel in the middle between the cylindrical transport frames 6a, 6B; 6C, 6D. In this arrangement, the transport device 1 can be inserted axially into a tube or container 60 (see FIG. 9a). The coupling device 1 can therefore be adapted to any receptacle.

FIG. 11 shows an inventive transport device 1 with a transport frame 6 according to FIG. 2e, which is suspended from a support device 10 by the four rope-shaped insulation elements 69. The transport frame 6 is suspended and insulated from the support device 10 and thus forms a barely damped oscillation system via which the process material, which is fed from a feed device 9, can be optimally transported or conveyed.

By preferably individually controlling the ultrasonic transducer 81 by signals 188, the conveying process on the transport frame 6 can be controlled and the process material P can be precisely dispensed. Due to the one-piece connection of the possibly plate-shaped distributor body 83 with the transport frame 6 and the floating installation of the transport frame 6, which forms an oscillation system, the desired treatment of the process material P is already possible with a low energy input. Through appropriate control, the process material P can be acted upon in a targeted manner in order to convey it in a dosed manner and, if necessary, to mix it.

The feeder 9, located above the transport frame 6, comprises an input channel 91 and an output channel 93, both shown cut open and enclosing a screen 2 therebetween. The screen 2 consists of a perforated plate connected to an ultrasonic transducer 81 by a curved coupling rod 82. A rotor 95 driven by a motor 96 is rotatably held within the input channel 91, which pre-processes and/or feeds the process material P to the screen or sieve 2.

The invention claimed is:

1. A transport device for the transport of pulverous or granular process material, comprising:
    an open or in itself closed transport frame made of metal, which transport frame is provided for the transport of the process material, which transport frame is held by a support device and which transport frame is connected to an ultrasonic device, which ultrasonic device comprises an ultrasonic generator, an ultrasonic transducer connected to the ultrasonic generator and a coupling rod, which is connected to the ultrasonic transducer and which is having a front end piece and a rear end piece,
    wherein a flat distributor body made of metal is provided, which distributor body has an upper side, a lower side, a rear side and peripherally at least one connection side,
    wherein the rear end piece of the coupling rod is connected to the ultrasonic transducer and the front end piece of the coupling rod is welded to the rear side, the upper side or the lower side of the distributor body,
    wherein the distributor body has coupling fingers at the connection side that are separated from one another by intermediate spaces and which coupling fingers have identical or different cross section, and
    wherein the at least one connection side of the distributor body is integrally connected with the at least one transport frame, or the at least one connection side of the distributor body is welded to the at least one transport frame, or the at least one connection side of the distributor body is connected via a coupling device integrally to the at least one transport frame.

2. The transport device according to claim 1, wherein the transport frame is a tube, a ring, a container, a funnel, a cylinder, a channel or a plate and that the distributor body is symmetrically formed or that the distributor body is symmetrically or asymmetrically formed as a metal plate or grid plate.

3. The transport device according to claim 1, wherein the transport frame comprises or holds at least one screen lining or at least one filter serving for processing the process material.

4. The transport device according to claim 1, wherein the connection side of the distributor body adjoins the transport frame and that the distributor body is symmetrical or asymmetrical with respect to an axis running perpendicular to the transport frame and is aligned in one or the other direction parallel or inclined to the conveying direction of the process material.

5. The transport device according to claim 1, wherein the distributor body is connected to a plurality of transport frames, wherein at least a first coupling finger of the distributor body is welded to a first transport frame and a second coupling finger is welded to a second transport frame.

6. The transport device according to claim 1, wherein the distributor body has one or more distribution channels into which at least one medium can be introduced directly or through the ultrasonic transducer and from which the medium can be delivered to the transport frame or to the process material carried in the transport frame; or the distributor body and the transport frame have one or more distribution channels into which at least one medium can be introduced directly or through the ultrasonic transducer and from which the medium can be discharged via one or more outlet openings to the transport frame or to the process material carried in the transport frame.

7. The transport device according to claim 1, wherein the transport frame is connected to the support device by one or more non-metallic or elastic or non-metallic and elastic insulation elements.

8. The transport device according to claim 1, wherein two cylindrical transport frames are integrally formed from a sheet, which sheet is welded between the two transport frames to one of the connection sides of the distributor body.

9. The transport device according to claim 1, wherein several distributor bodies, each of which is connected to an ultrasonic generator via at least one coupling rod and an ultrasonic transducer, are welded to the transport frame in the same plane or in different planes, or that a distributor body, which is connected to an ultrasonic generator via at least one coupling rod and one ultrasonic transducer, at least partially encloses the transport frame as a circular segment, ring segment or as a spiral.

10. The transport device according to claim 1, wherein the distributor body is connected to the transport frame via the coupling device, which coupling device comprises a coupling bar welded to the distributor body and is connected by at least one transfer bar to at least one connection bar welded to the associated transport frame.

* * * * *